US011168965B2

(12) United States Patent
Strempke et al.

(10) Patent No.: US 11,168,965 B2
(45) Date of Patent: Nov. 9, 2021

(54) NARROW STOCK RIP GUIDE CUTTING SYSTEM

(71) Applicants: Shelby Strempke, Kelly, IA (US); Paul Eilts, Zearing, IA (US)

(72) Inventors: Shelby Strempke, Kelly, IA (US); Paul Eilts, Zearing, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 195 days.

(21) Appl. No.: 16/533,000

(22) Filed: Aug. 6, 2019

(65) Prior Publication Data

US 2020/0056873 A1  Feb. 20, 2020

Related U.S. Application Data

(60) Provisional application No. 62/714,843, filed on Aug. 6, 2018.

(51) Int. Cl.
*G01B 3/1084* (2020.01)
*G01B 3/1005* (2020.01)
(Continued)

(52) U.S. Cl.
CPC ......... *G01B 3/1084* (2013.01); *B23D 59/002* (2013.01); *B27B 9/04* (2013.01); *G01B 3/04* (2013.01); *G01B 3/1005* (2013.01); *G01B 3/1071* (2013.01); *G01B 3/1089* (2020.01); *G01B 2003/1015* (2013.01); *G01B 2003/1074* (2013.01)

(58) Field of Classification Search
CPC .......... B27B 9/04; B27B 59/002; B23D 47/02

USPC ................................................... 33/630, 640
See application file for complete search history.

(56) References Cited

U.S. PATENT DOCUMENTS 2,903,026 A * 9/1959 Frydenlund .......... B23Q 9/0085
83/468.3
2,964,848 A 2/1960 Gonsalves
(Continued)

OTHER PUBLICATIONS

Seneca—Thin Ripping With Seneca Parallel Guides and Festool Track Saw Jan. 11, 2017.
(Continued)

*Primary Examiner* — Christopher W Fulton
(74) *Attorney, Agent, or Firm* — Christopher A. Proskey; BrownWinick Law Firm

(57) ABSTRACT

A system for cutting narrow workpieces having a track that extends a width between a cutting edge and a non-cutting edge. One or more measuring bodies are connected to a slot adjacent the non-cutting edge that include a measuring bar that extends forward from the front side of the measuring body and under the track as well as extends rearward from the rear side of the measuring body. The measuring bar slides within the measuring body to accommodate the desired workpiece thickness. The measuring bar includes measuring indicia and a measuring member that facilitates measurement of workpiece thickness. Measuring body includes a locking member that locks the measuring bar at a desired thickness. Measuring member may be adjusted to calibrate the measuring member to the track and saw using a locking member. Measuring body also includes a support leg and associated locking mechanism that levels the measuring body.

40 Claims, 25 Drawing Sheets

(51) Int. Cl.
*G01B 3/1071* (2020.01)
*G01B 3/04* (2006.01)
*B27B 9/04* (2006.01)
*B23D 59/00* (2006.01)
*G01B 3/1007* (2020.01)
*G01B 3/1089* (2020.01)

(56) References Cited

U.S. PATENT DOCUMENTS

| | | | | |
|---|---|---|---|---|
| 4,125,942 A * | 11/1978 | Horner | ............... | B23Q 1/621 |
| | | | | 33/430 |
| 4,128,940 A * | 12/1978 | Ong | ............... | B23Q 9/0028 |
| | | | | 30/373 |
| 4,200,984 A | 5/1980 | Fink | | |
| 4,205,448 A | 6/1980 | Asai | | |
| 4,483,071 A * | 11/1984 | te Kolste | ............ | B23Q 1/4804 |
| | | | | 30/376 |
| 4,945,799 A * | 8/1990 | Knetzer | .............. | B23Q 9/005 |
| | | | | 83/471.3 |
| 4,998,356 A | 3/1991 | Chapin | | |
| 5,103,566 A * | 4/1992 | Stebe | ............... | B23Q 1/4804 |
| | | | | 30/376 |
| 6,173,631 B1 * | 1/2001 | Schock | ............ | B23Q 9/0042 |
| | | | | 83/13 |
| 7,020,978 B1 | 4/2006 | Nelson | | |
| 7,610,839 B1 * | 11/2009 | Bessette | ............. | B23Q 9/0014 |
| | | | | 30/373 |
| 8,020,312 B1 | 9/2011 | McGahan | | |
| 8,464,436 B2 | 6/2013 | Smith | | |
| 9,233,464 B2 | 1/2016 | Sherman | | |
| 2004/0010926 A1 * | 1/2004 | Hampton | ............... | B27B 9/04 |
| | | | | 30/374 |
| 2004/0079215 A1 * | 4/2004 | Vlaar | ............... | B23Q 9/0042 |
| | | | | 83/745 |
| 2006/0196072 A1 | 9/2006 | Lewis | | |
| 2010/0299948 A1 | 12/2010 | Choi | | |
| 2012/0079931 A1 * | 4/2012 | Hansen | ................ | B27B 9/04 |
| | | | | 83/508.2 |
| 2014/0026725 A1 * | 1/2014 | Makropoulos | ......... | B27B 9/04 |
| | | | | 83/13 |
| 2015/0362304 A1 | 2/2015 | McCallum | | |
| 2017/0322006 A1 | 11/2017 | Stewart | | |
| 2018/0328704 A1 * | 11/2018 | Kennedy | ............. | G01B 3/566 |

OTHER PUBLICATIONS

Woodpeckers—Parallel Guide System May 4, 2015.
Birddogs—Narrow Stock Rip Guides Aug. 2, 2013.
Ron Paulk; Parallel Guides for Festool Track Saw—https://youtu.be/IGFZYEhGNHI Jun. 13, 2015.
Festool; Parallel Side Fences FS-PA Item No. 495717 Jan. 1, 2018.
Woodpeckers Parallel Guide System—https://www.youtube.com/watch?v=Ue08WvCoBA8 May 4, 2015.
Seneca Woodworking; Parallel Guide System for Festool and Makita Track Saw Guide Rail (without Incra T-Track) Jan. 1, 2018.

* cited by examiner

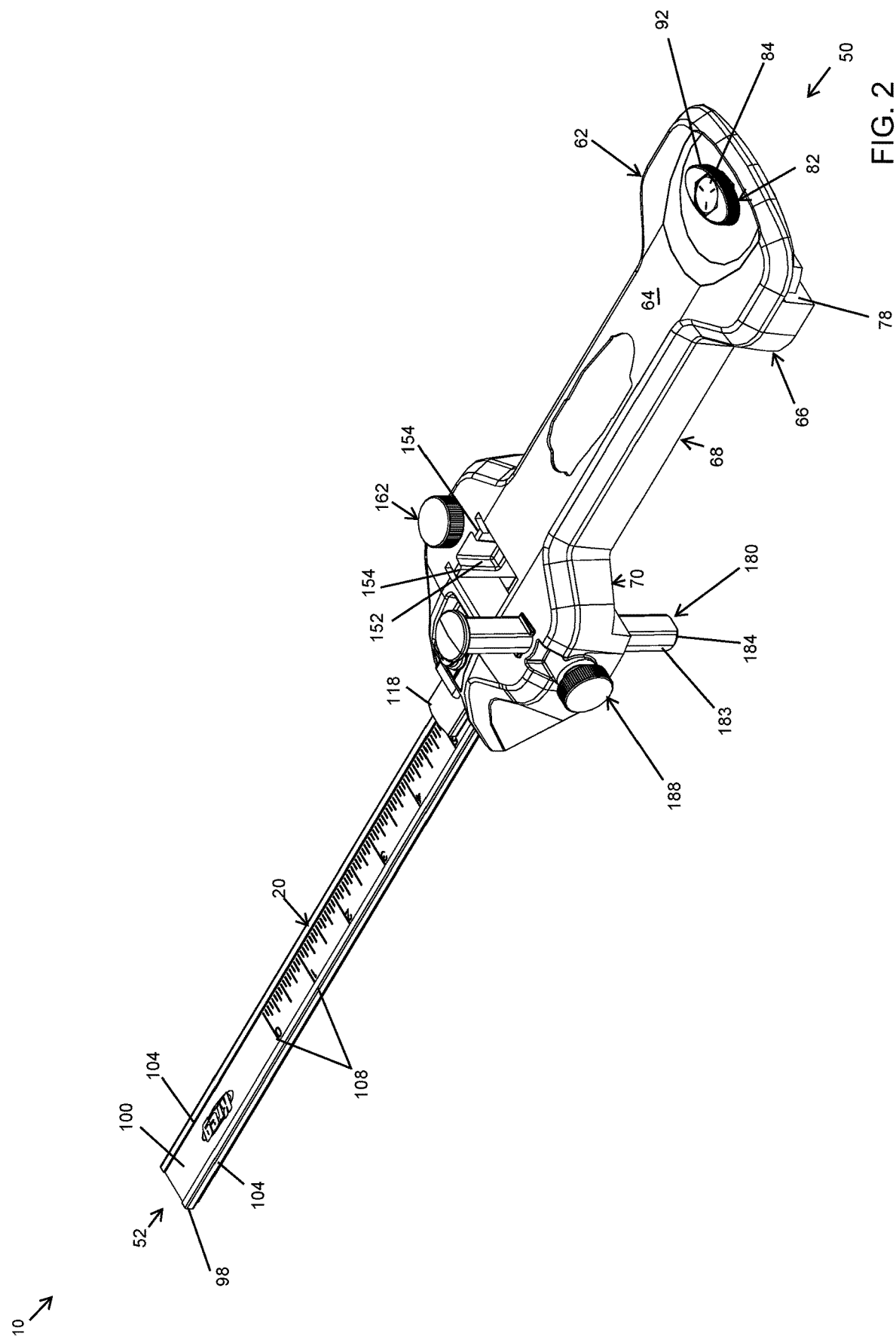

NARROW STOCK RIP GUIDE CUTTING SYSTEM

CROSS REFERENCE TO RELATED APPLICATIONS

This application claims the benefit of U.S. Provisional Application No. 62/714,843 which was filed on Aug. 6, 2019, the entirety of which is incorporated herein fully by reference.

FIELD OF THE DISCLOSURE

This disclosure relates to a cutting system. More specifically and without limitation, this disclosure relates to a system for cutting narrow pieces of material using a track and narrow rip stock guides.

BACKGROUND OF THE DISCLOSURE

A number of systems and devices have been developed for cutting wood and other materials. Common types of cutting systems include: band saws, circular saws, miter saws and table saws. Each of these saw configurations have their own unique benefits as well as their own unique disadvantages and drawbacks.

Band saws are formed of a rotating saw blade that is formed in the shape of a band, or said another way, in a continuous loop. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop where they are relatively permanently installed. In addition, band saw blades are generally expensive. Also, band saws generally have a slow through-put. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction and due to appearance, it is true that the exposed blade is very dangerous, especially when used by the novice user. Another disadvantage of table saws is that due to the fact that the blade protrudes from a table-top-like surface, table saws are relatively large, heavy, complicated and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop where they are relatively permanently installed.

Yet another disadvantage of table saws is that they have a tendency to kick-back material during cutting. A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously this can be a very dangerous situation, not to mention a very scary one.

Another disadvantage of table saws is that they can be very difficult to use when cutting large sheets of material because the entire piece of material must be moved, not to mention moved in a precise manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively simple and inexpensive devices, and unlike table saws, circular saws generally have a blade cover that at least tries to protect the user from non-cutting portions of the blade. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately cut small pieces of material with a circular saw. In addition, it is difficult to make a long and straight cut with circular saws. Another disadvantage to circular saws is that the blade guide often gets into the way when a user is attempting to make a cut, which can cause the cutting operation to be less-safe and can cause the cutting operation to be less accurate. Another disadvantage of circular saws is because the blade rotates upward through the workpiece circular saws tend to cause a great amount of tear out on the upper-positioned surface of the workpiece that is cut as it is unsupported.

Miter saws are generally formed of a rotating saw blade that vertically pivots on a hinge and plunges toward a base and into and through a workpiece placed on the base. Miter saws are particularly well suited to make perpendicular cuts in smaller width workpieces that may be anywhere from extremely long to extremely short. Miter saws also angularly pivot so as to facilitate a wide range of angular cuts. Miter saws can be used to make highly precise and repeatable cuts. Miter saws are relatively inexpensive, and unlike table saws, miter saws generally have a blade cover that at least tries to protect the user from the blade. Miter saws are relatively portable.

While miter saws have many advantages, they also have many disadvantages. Namely, miter saws cannot be used for cutting through wide and/or thick workpieces. In addition, it is difficult to see exactly where a cut is going to be made on a workpiece prior to making the cut, which leads to inaccurate cuts as well as delay in making the cuts. That is, there is no easily perceptible indication where the cut is going to be made on the workpiece prior to actually performing the cut. For these and other reasons, despite their advantages, miter saws suffer from many substantial disadvantages and limitations.

As such, the prior art cutting systems suffer from many substantial disadvantages including being: unsafe, inaccurate, large, expensive, hard to use, they have limited accuracy, they are hard to guide, they are not easily portable, and they form low quality cuts, among many other disadvantages.

There is presently no cost effective, safe, efficient, accurate and easily used system for making long cuts in narrow work pieces.

Therefore, for all the reasons stated above, and the reasons stated below, there is a need in the art for an improved narrow stock rip guide cutting system that is cost effective, safe, efficient, accurate and easily used system for making long cuts in narrow work pieces.

Thus, it is a primary object of the disclosure to provide a narrow stock rip guide cutting system and method that improves upon the state of the art.

Another object of the disclosure is to provide a narrow stock rip guide cutting system and method that is safe to use.

Yet another object of the disclosure is to provide a narrow stock rip guide cutting system and method that is efficient to use.

Another object of the disclosure is to provide a narrow stock rip guide cutting system and method that is relatively inexpensive.

Yet another object of the disclosure is to provide a narrow stock rip guide cutting system and method that is capable of making long straight cuts.

Another object of the disclosure is to provide a narrow stock rip guide cutting system and method that can be used to cut narrow sheets of material easily and accurately.

Yet another object of the disclosure is to provide a narrow stock rip guide cutting system and method that is accurate.

Another object of the disclosure is to provide a narrow stock rip guide cutting system and method that is efficient.

Yet another object of the disclosure is to provide a narrow stock rip guide cutting system and method that provides precise alignment.

Another object of the disclosure is to provide a narrow stock rip guide cutting system and method that can be used with workpieces with a wide range of thicknesses.

Yet another object of the disclosure is to provide a narrow stock rip guide cutting system and method that is easy to learn how to use.

Another object of the disclosure is to provide a narrow stock rip guide cutting system and method that is relatively small in size and shape.

Yet another object of the disclosure is to provide a narrow stock rip guide cutting system and method that provides the benefits of a circular saw and a table saw in a single device.

Another object of the disclosure is to provide a narrow stock rip guide cutting system and method that holds workpieces in a firm and rigid manner.

Yet another object of the disclosure is to provide a narrow stock rip guide cutting system and method that is easy to set up.

Another object of the disclosure is to provide a narrow stock rip guide cutting system and method that is easy to take down.

Yet another object of the disclosure is to provide a narrow stock rip guide cutting system and method that is formed of a minimum number of parts.

Another object of the disclosure is to provide a narrow stock rip guide cutting system and method that is simple to use.

Yet another object of the disclosure is to provide a narrow stock rip guide cutting system and method that is easier to use than prior art systems.

Another object of the disclosure is to provide a narrow stock rip guide cutting system and method that is unique.

Yet another object of the disclosure is to provide a narrow stock rip guide cutting system and method that collapses and is easy to store.

Another object of the disclosure is to provide a narrow stock rip guide cutting system and method that is light weight.

Yet another object of the disclosure is to provide a narrow stock rip guide cutting system and method that is high quality.

Another object of the disclosure is to provide a narrow stock rip guide cutting system and method that has a robust design.

Yet another object of the disclosure is to provide a narrow stock rip guide cutting system and method that has a long useful life.

Another object of the disclosure is to provide a narrow stock rip guide cutting system and method that provides accurate and clean cuts.

Yet another object of the disclosure is to provide a narrow stock rip guide cutting system and method that helps prevent chip tear-out.

Another object of the disclosure is to provide a narrow stock rip guide cutting system and method that is durable.

Yet another object of the disclosure is to provide a narrow stock rip guide cutting system and method that saves time.

Another object of the disclosure is to provide a narrow stock rip guide cutting system and method that is fun to use.

Yet another object of the disclosure is to provide a narrow stock rip guide cutting system and method that can be used with workpieces of practically any material.

Another object of the disclosure is to provide a narrow stock rip guide cutting system and method that is easily portable and can be used on a job site.

Yet another object of the disclosure is to provide a narrow stock rip guide cutting system and method that makes it easier to measure for cuts on narrow workpieces and sheets of material.

Another object of the disclosure is to provide a narrow stock rip guide cutting system and method that makes measuring more repeatable than prior art systems.

Yet another object of the disclosure is to provide a narrow stock rip guide cutting system and method that reduces or eliminates the need for a helper when making cuts.

Another object of the disclosure is to provide a narrow stock rip guide cutting system and method that firmly locks a measurement in place so as to allow repeatable cuts.

These and other objects, features, or advantages of the disclosure will become apparent from the specification, figures and claims.

SUMMARY OF THE DSISCLOSURE

A system for cutting narrow workpieces is presented having a track that extends a length between opposing ends and extends a width between a cutting edge and a non-cutting edge. One or more measuring bodies are connected to a slot adjacent the non-cutting edge that include a measuring bar that extends forward from the front side of the measuring body and under the track as well as extends rearward from the rear side of the measuring body. The measuring bar slides within the measuring body to accommodate the desired workpiece thickness. The measuring bar includes measuring indicia and the measuring body includes a measuring member that facilitates measurement of workpiece thickness. Measuring body includes a locking member that facilitates locking the measuring bar in place once set to a desired thickness. Measuring member may be adjusted to calibrate the measuring member to the track and saw using a locking member. Measuring body also includes a support leg and associated locking mechanism that may be set to support the measuring body at a desired height above a work surface so as to facilitate a level orientation, In this way, a system is presented that facilitates quick, easy, accurate and repeatable cuts on narrow workpieces.

BRIEF DESCRIPTION OF THE DRAWINGS

FIG. 2 is a perspective view of the narrow stock rip guide cutting system shown in FIG. 1, the view showing the font right front right top side;

DETAILED DESCRIPTION OF THE DISCLOSURE

Figure 1:
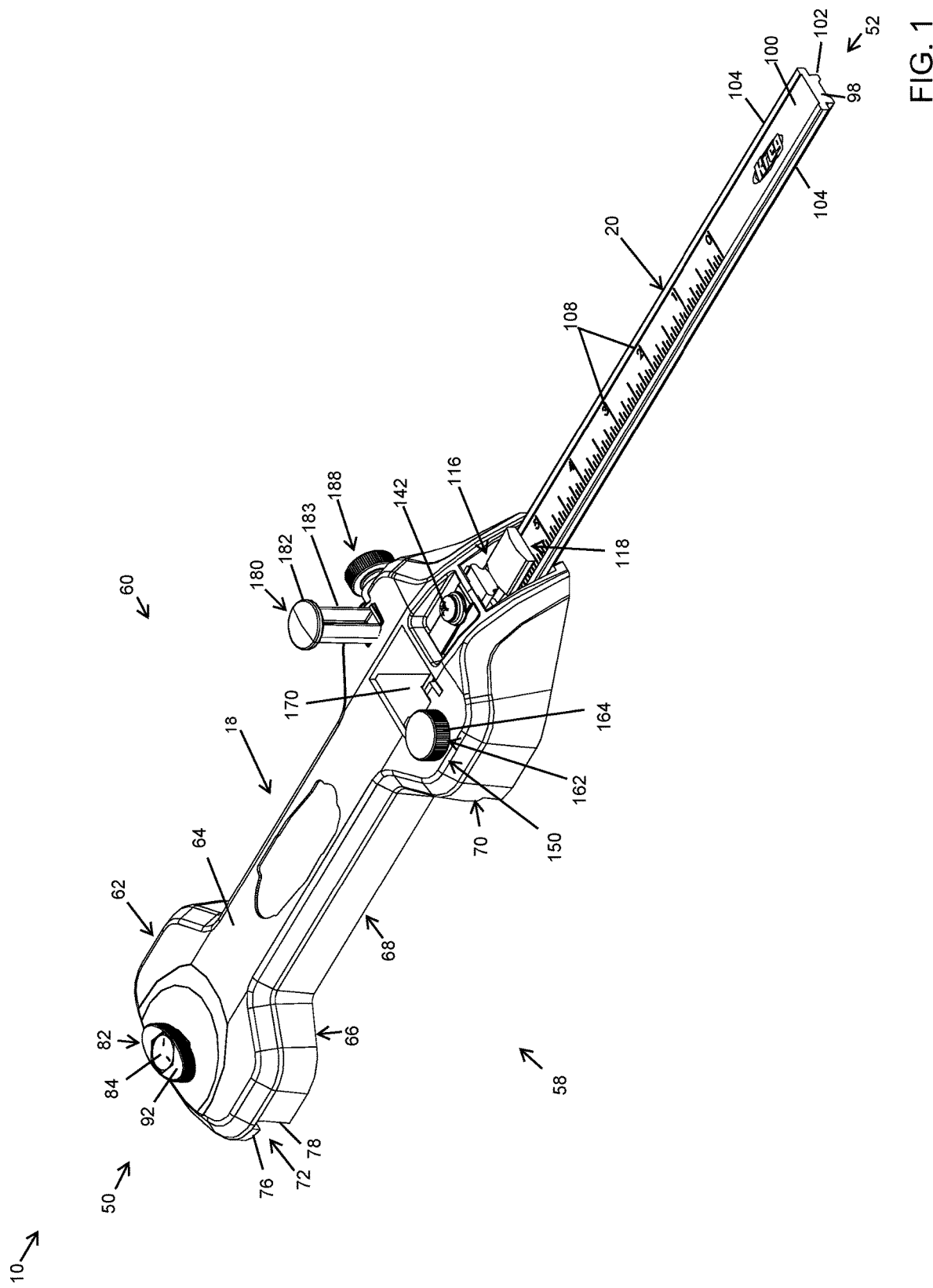
FIG. 1 is a perspective view from the rear left top side of a narrow stock rip guide cutting system, the view showing the narrow stock rip guide cutting sytem having a measuring body that extends a length from a front side to a rear side, the view showing a measuring bar slidably connected to the measuring body and extending outward from the rear side of the measuring body, the view showing calibration member positioned at the rear side of the measuring body above the measuring bar that is a clear lens with an indicia or line therein or another indicia that indicates the width of the cut, the view showing a support member positioned at the rear side of the measuring body on one side of the measuring bar opposite the knob that tightens the measuring bar in place wherein the support member levels the measuring body when the track is placed on a workpiece and the measuring body is suspended above the benchtop or work surface.
Figure 3A:
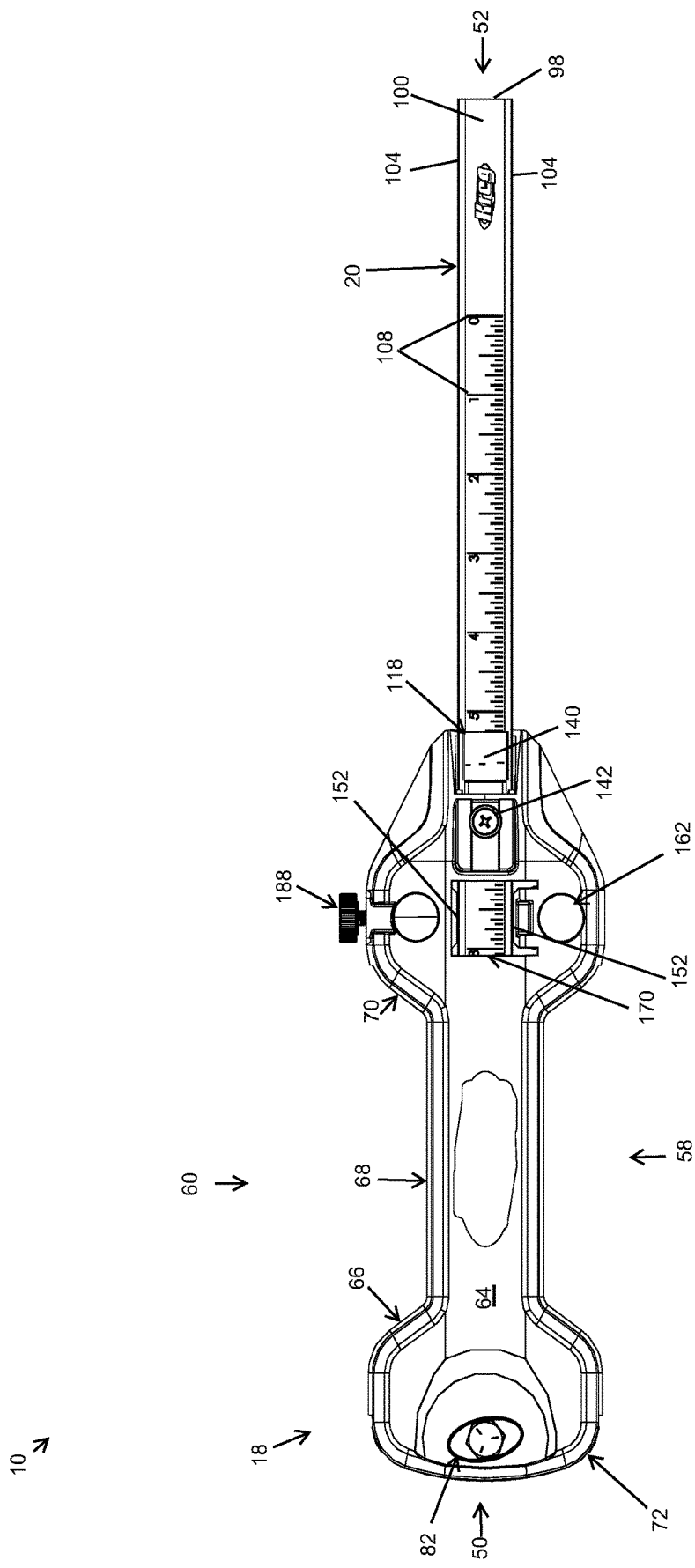
FIG. 3A is a top elevation view of the narrow stock rip guide cutting system shown in FIG. 1; the view showing the system with a window providing a view of measuring indicia.
Figure 3B:
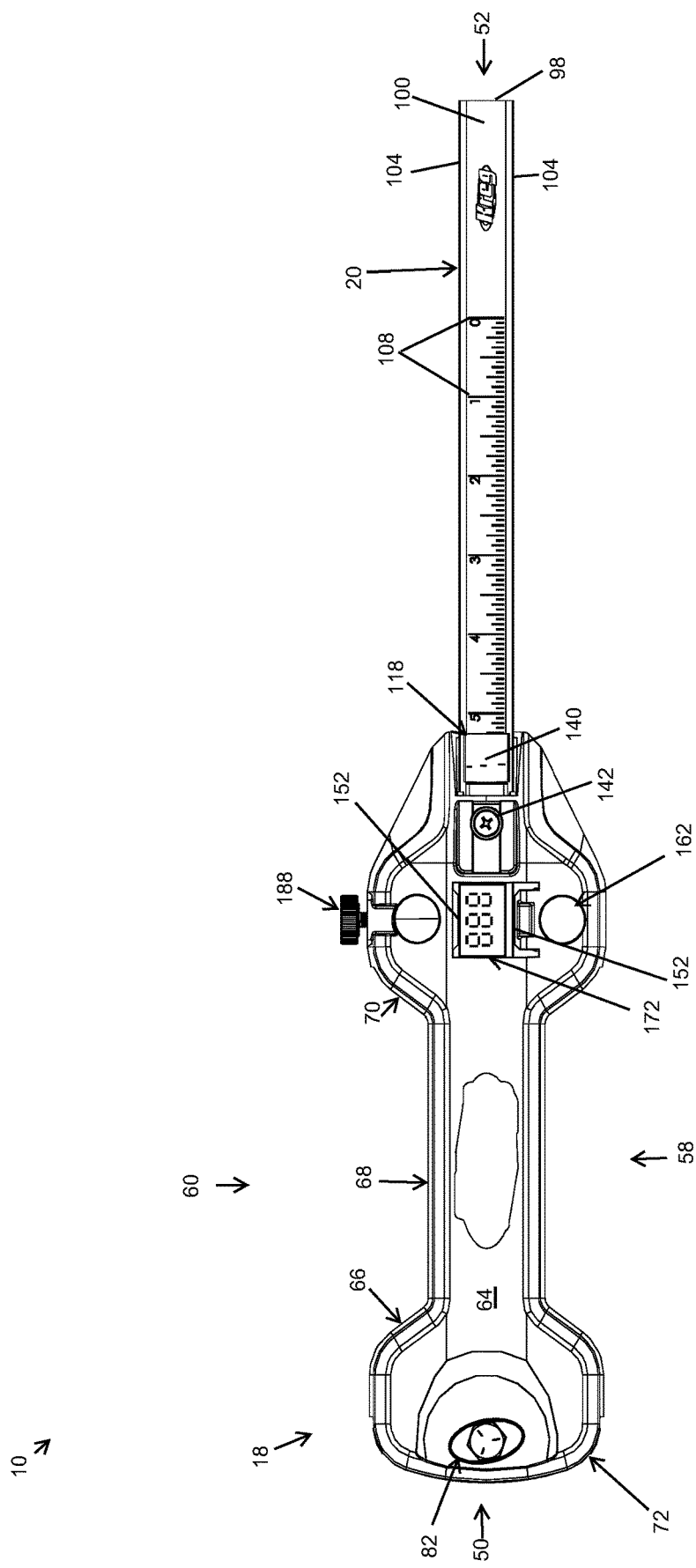
FIG. 3B is a top elevation view of the narrow stock rip guide cutting system shown in FIG. 1; the view showing the system with a digital display for display of measurements.
Figure 4:
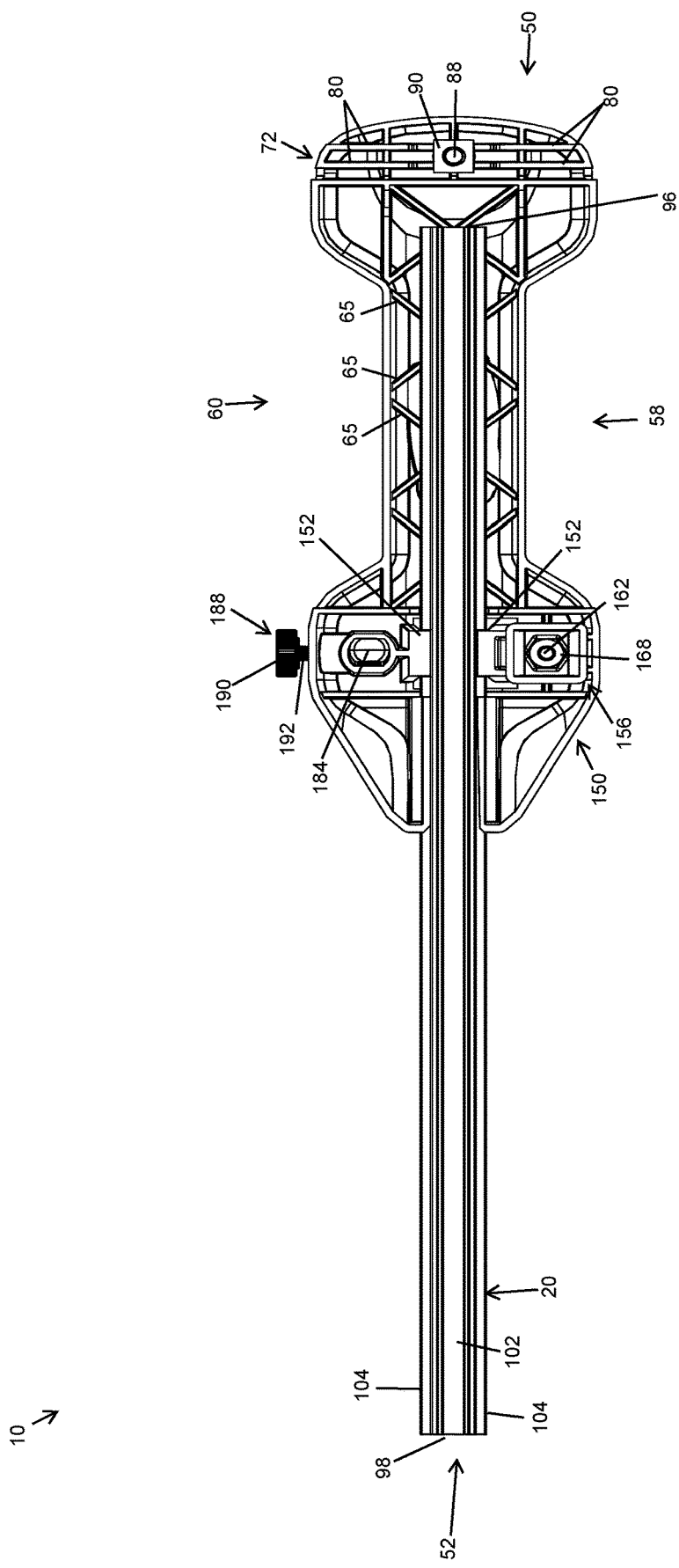
FIG. 4 is a bottom elevation view of the narrow stock rip guide cutting system shown in FIG. 1.
Figure 5:
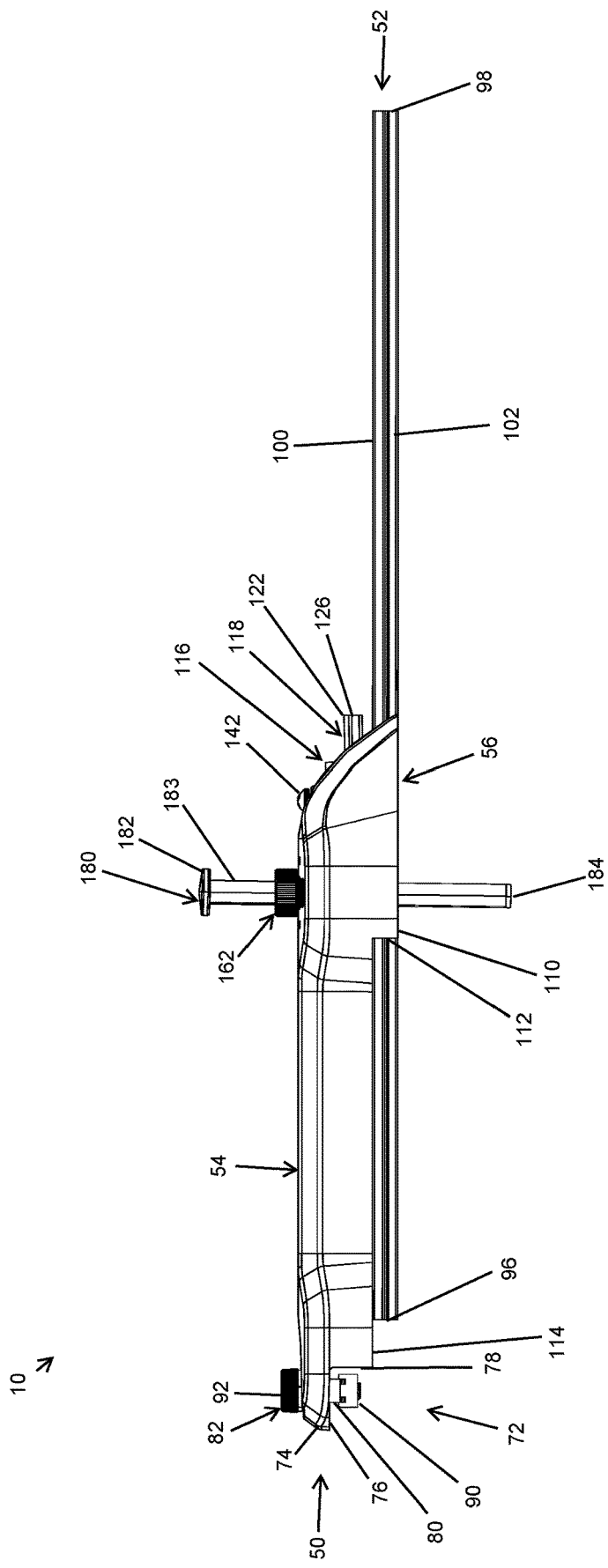
FIG. 5 is a left side elevation view of the narrow stock rip guide cutting system shown in FIG. 1.
Figure 6:
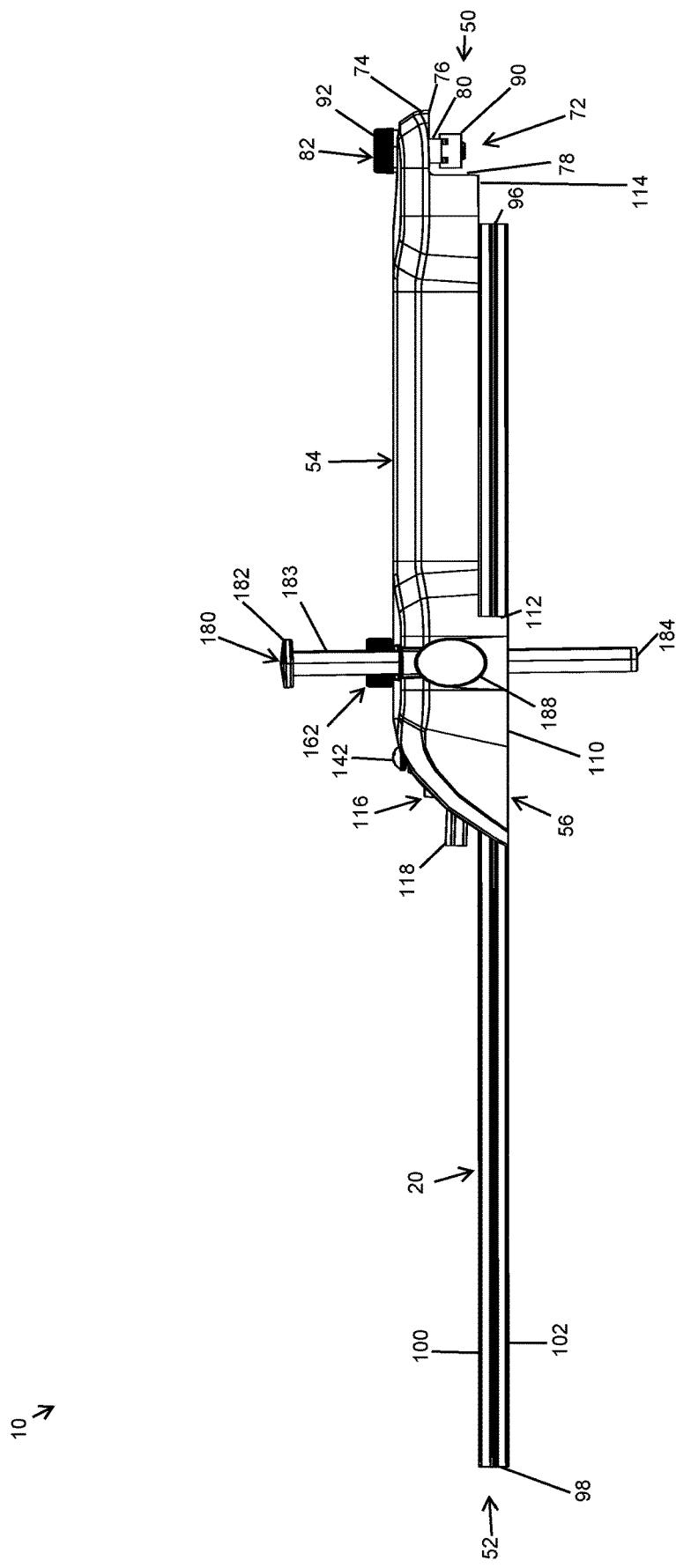
FIG. 6 is a right elevation view of the narrow stock rip guide cutting system shown in FIG. 1.
Figure 7:
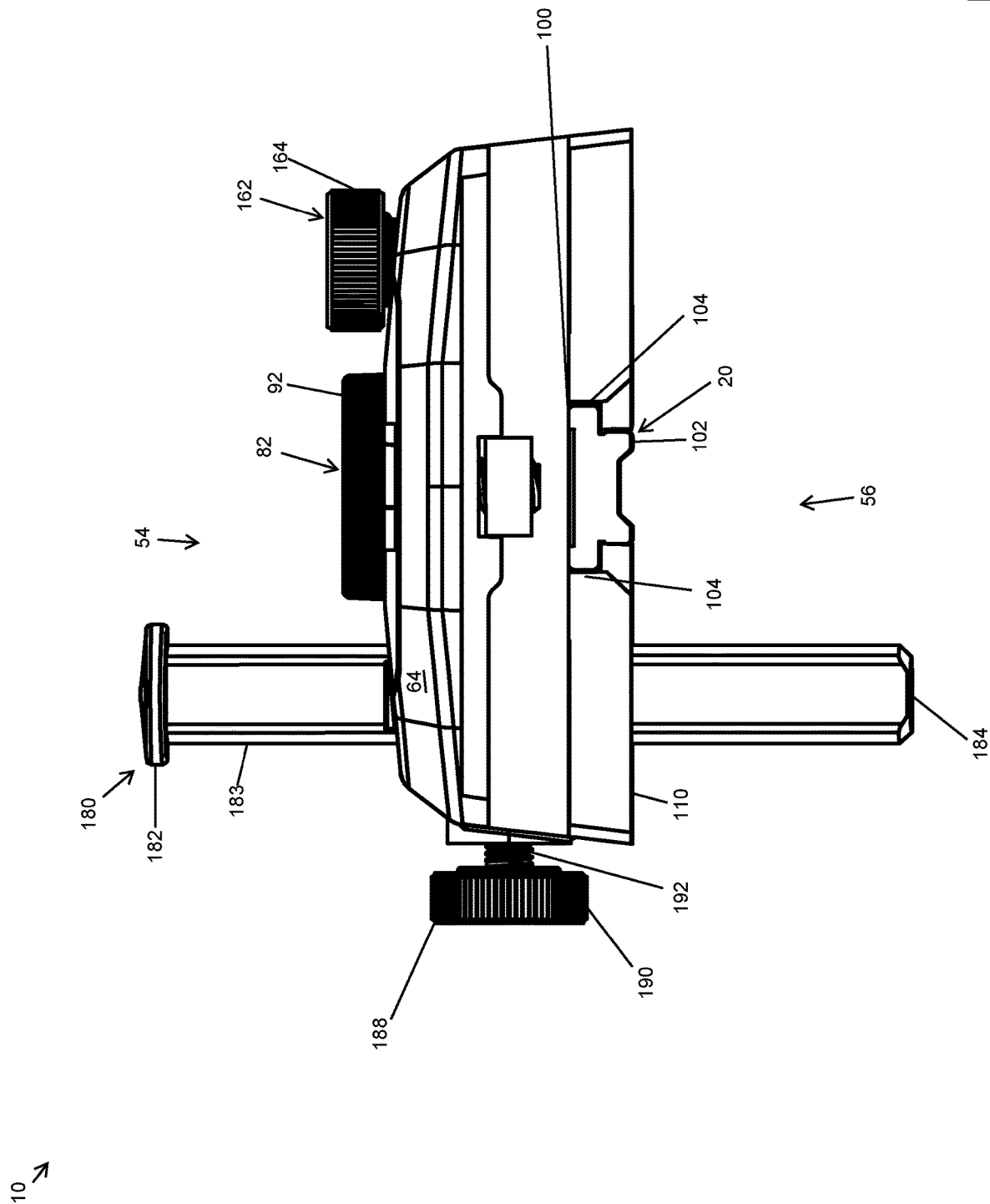
FIG. 7 is a front elevation view of the narrow stock rip guide cutting system shown in FIG. 1.
Figure 8:
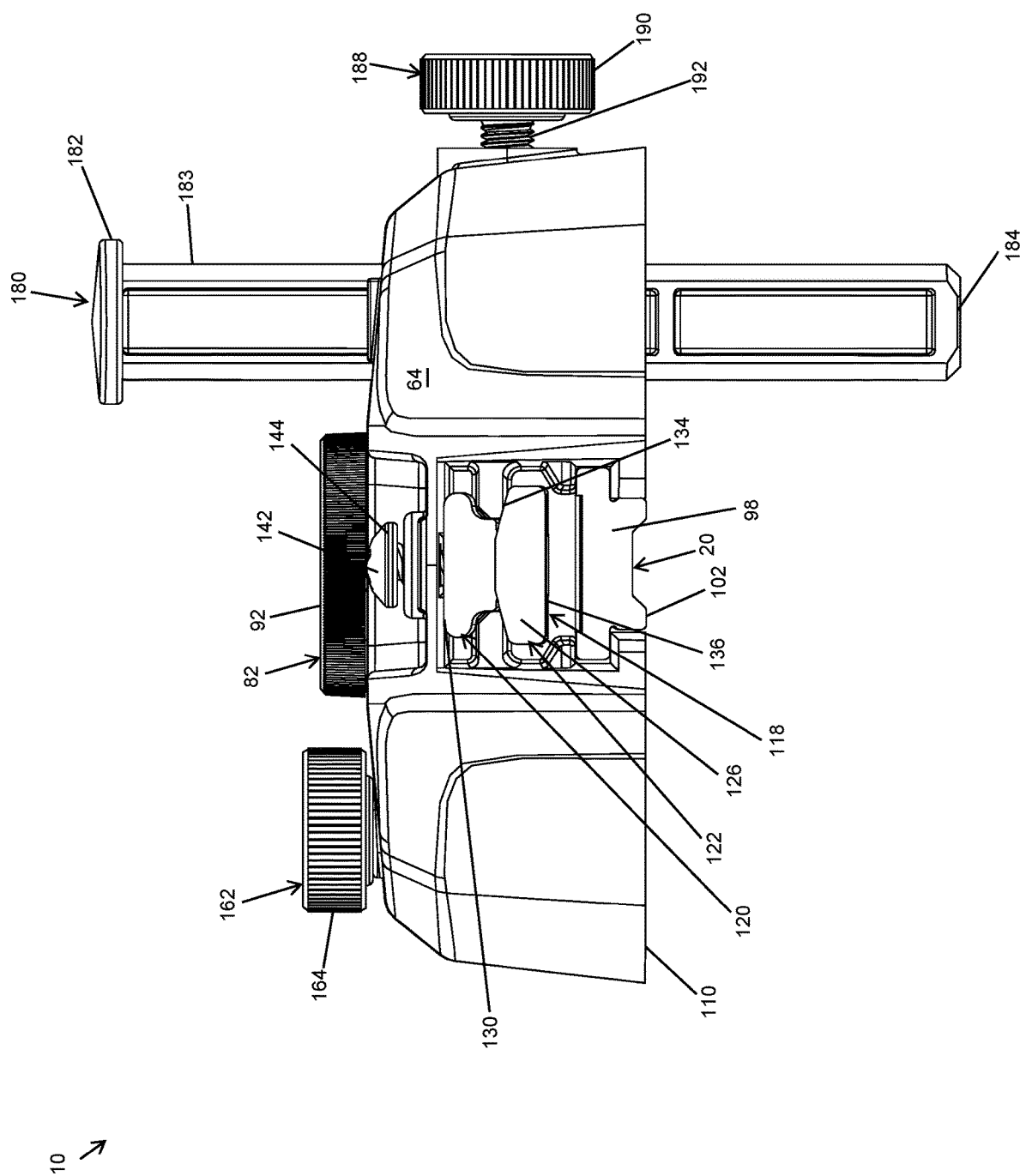
FIG. 8 is a rear elevation view of the narrow stock rip guide cutting system shown in FIG. 1.
Figure 9:
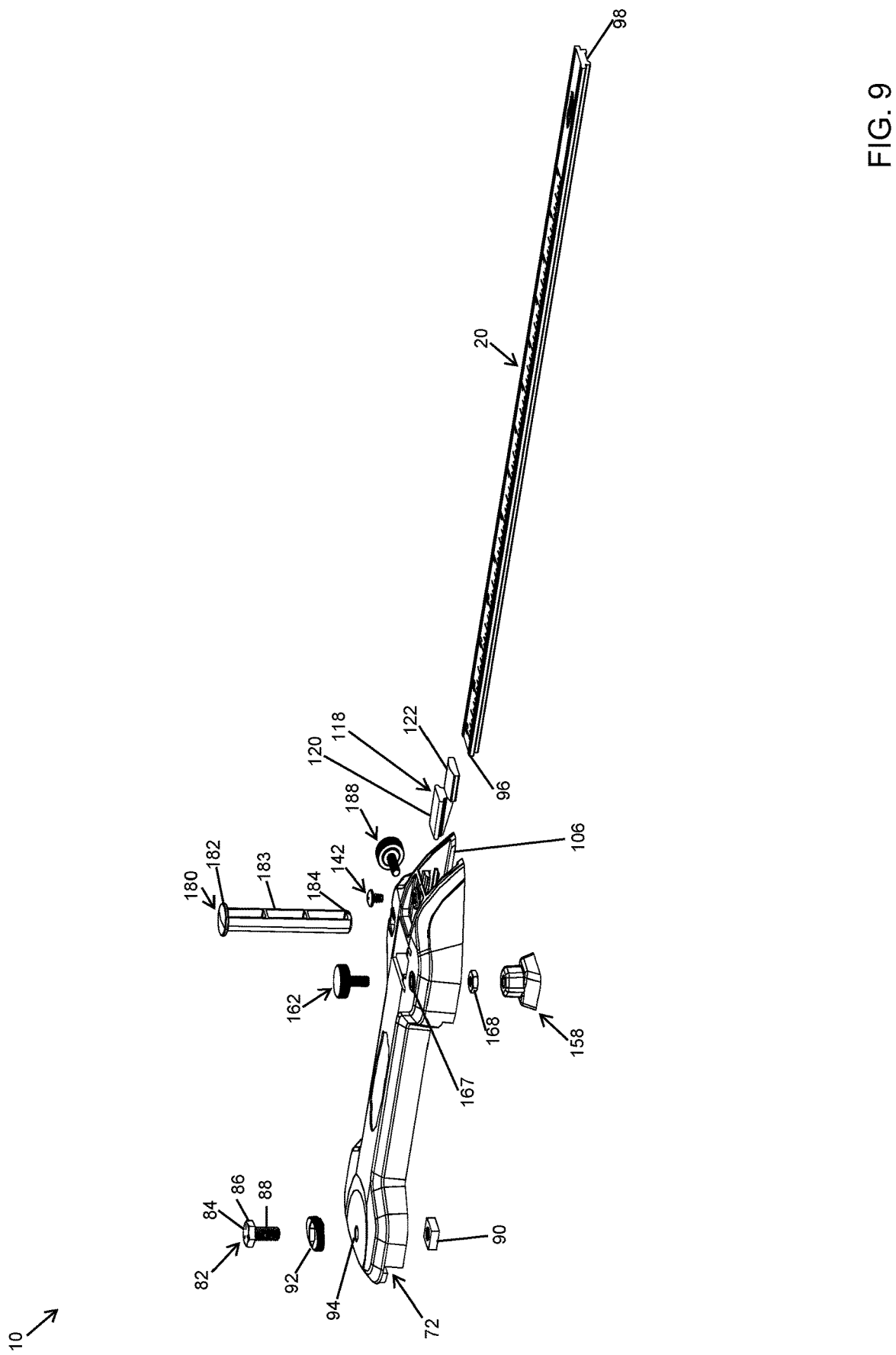
FIG. 9 is an exploded perspective view of the narrow stock rip guide cutting system shown in FIG. 1, the view showing the rear left top side.
Figure 10:
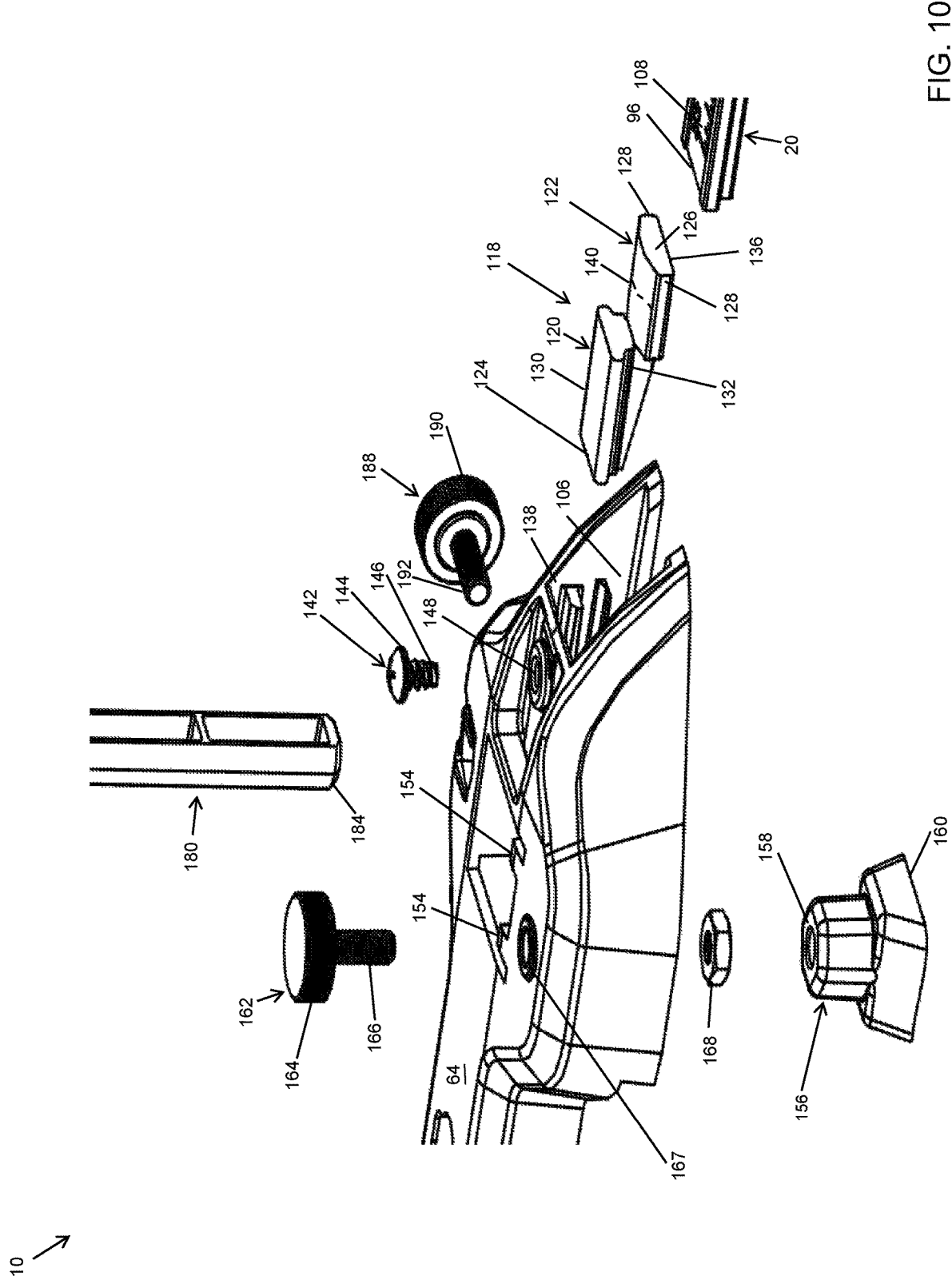
FIG. 10 is a close-up perspective view of the view shown in FIG. 9, the view showing a close-up of the rear side of the measuring body, the view showing the wedge of the locking member and the adjustable member of the calibration member in exploded form.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure (s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System:

With reference to the figures, a narrow stock rip guide cutting system 10 (system 10) is presented. Narrow stock rip guide cutting system 10 is formed of any suitable size, shape and design and is configured to facilitate the safe cutting of narrow workpieces in a quick, easy, safe, accurate and fun manner. In the arrangement shown, as one example, the narrow stock rip guide cutting system 10 includes the following component pieces, among others: a track 12, a saw 14 having a guide 16, one or more measuring bodies 18 connected to the track 12 each having a measuring bar 20 that moves between an extended position and a retracted position that is used to measure the width of a workpiece 22 for a cutting operation.

Track:

In one arrangement, system 10 includes a track 12. Track 12 is formed of any suitable size, shape and design and is configured to receive and guide a saw 14 having a guide 16 attached thereto to perform a cutting operation on workpiece 22. In the arrangement shown, as one example, track 12 extends a length between an opposing first end 24 and second end 26 and extends a width between a cutting edge 28 or front edge and a non-cutting edge 30 or rear edge, and includes an upper surface 32 and a lower surface 34. In the arrangement shown, as one example, track 12 is formed of an extruded member, meaning that the features of track 12 extend in a consistent or relatively consistent manner from first end 24 to second end 26.

First Protrusion: In the arrangement shown, as one example, track 12 has a generally flat upper surface 32 that extends in approximate parallel spaced relation to a generally flat lower surface 34. In one arrangement, to help provide guidance to saw 14 as it slides along the length of track 12, track 12 includes a first protrusion 36 that extends upward from the upper surface 32 a distance, however a recess is also contemplated as is a combination of a protrusion and a recess or multiple protrusions or recesses or any combination thereof. In the arrangement shown, as one example, first protrusion 36 is positioned between the cutting edge 28 and the non-cutting edge 30 of track 12, at or near the middle of track 12. When viewed from an end 24, 26, first protrusion 36 is a generally square or rectangular shaped protrusion that extends upward from the upper surface of track 12. In the arrangement shown, first protrusion 36 forms a downward facing groove, or in the arrangement shown, a T-slot that may be used to receive fasteners or connecting members for connecting tools and accessories or other sections of track to the track 12. First protrusion 36 is configured to be received by a recess in a guide 16 connected to saw 14 such that when saw 14 slides along track 12, the first protrusion 36 is received within a corresponding recess in the guide 16 of saw 14 thereby providing precise alignment and guidance to saw 14 thereby placing the blade of saw 14 adjacent the cutting edge 28.

Second Protrusion: In the arrangement shown, as one example, track 12 includes a second protrusion 38 that, like first protrusion 36, extends upward from the upper surface 32 of track 12 a distance, however a recess is also contemplated as is a combination of a protrusion and a recess or multiple protrusions or recesses or any combination thereof. In the arrangement shown, as one example, second protrusion 38 is positioned at, near or along the non-cutting edge 30 of track 12 and when viewed from an end 24, 26 is a generally square or rectangular protrusion that extends upward from the upper surface 32 of track 12. In the arrangement shown, second protrusion 38 forms an upward facing groove, or in the arrangement shown, a T-slot, that may be used to receive fasteners or connecting members for connecting tools and accessories or other sections of track to the track 12, which in this example is one or more measuring bodies 18.

While two protrusions (first protrusion 36 and second protrusion 38) are shown extending upward from the upper surface of track 12, any number of protrusions are hereby contemplated for use, such as none, one, three, four, five, six or more; as is any number of recesses, or any combination thereof. In the arrangement where no protrusions are present in track 12, other features may be present such as one or more grooves or recesses in track 12 that receive protrusions in the guide 16 of saw 14 thereby providing guidance and alignment for saw 14.

Chip Strip: The cutting edge 28 of track 12 includes a chip strip 40. Chip strip 40 is formed of any suitable size, shape and design and is configured to be a consumable edge that is cut to precisely fit the blade of saw 14 to track 12 during a cutting operation. That is, in one arrangement, to provide durability and rigidity, track 12 is formed of a metallic material such as aluminum or an aluminum alloy or another metallic material. In contrast, chip strip 40 is formed of a plastic or composite or non-metallic material. Chip strip 40 extends past and outward from cutting edge 28 of track 12 a distance. Upon the first cut using saw 14, the chip strip 40 is precisely cut to fit and match the blade of saw 14 with tight and close tolerances. This close fitting arrangement between the blade of saw 14 and the chip strip 40 of track 12 facilitates cutting clean and precise cuts in workpiece 22 and helps to prevent tear out and chipping of the workpiece 22 during cutting as the outward edge of chip strip 40 is precisely above where cutting is performed. In this way, the outward edge, or cutting edge 28, of chip strip 40 supports the upper surface of workpiece 22 while it is cut, thereby preventing and/or reducing tear out.

In one arrangement, when viewed from an end, chip strip 40 is a generally rectangular member that is adhered to the lower surface 34 of track 12 adjacent its cutting edge 28. In one arrangement, as is shown, chip strip 40 extends all or a portion of the length of track 12 from first end 24 to second end 26. In one arrangement, as is shown, chip strip 40 is formed of two layers of non-metallic material. The upper layer is formed of a strong and rigid and hard non-metallic material. This hard material provides strength and rigidity to the chip strip 40. However, harder materials tend to have a lower coefficient of friction, which means that harder materials tend to slide over other objects easier than softer materials. It is undesirable to have chip strip 40 slide on workpiece 22. As such, a lower layer of softer material is placed below the upper layer of a hard material. This lower layer is softer than the upper layer and as such it does not have the strength and rigidity of the upper layer. However, the softer material of the lower layer has a much higher coefficient of friction than the harder upper layer. As such, the addition of the softer lower layer of material of chip strip 40 helps to impart a higher level of friction upon workpiece 22 when track 12 is placed onto workpiece 22. As such, the addition of the softer lower layer of material of chip strip 40 helps to hold a workpiece 22 in place during a cutting operation and helps to prevent a workpiece 22 from moving or shifting during a cutting operation, thereby improving the quality and accuracy of the cuts. Another benefit of having the lower layer of softer material is that it helps impart friction on the workpiece 22 at the point of cutting. That is, the workpiece 22 is held where the cut occurs. In the arrangement shown, the softer lower layer of material of chip strip 40 is much thinner than the harder and more-rigid upper layer of chip strip 40.

To be clear, the outward edge of chip strip 40 serves as the cutting edge for measuring purposes.

Grip Strip: In one arrangement, to further help hold a workpiece 22 in place, the lower surface 34 of track 12 includes one or more grip strips 42. Grip strips 42 are formed of any suitable size, shape and design and are configured to engage and hold a workpiece 22 in place when track 12 is lowered onto the workpiece 22. In one arrangement, as is shown, grip strips 42 are formed of a compressible material having a high coefficient of friction such as a rubber, a foam, a rubberized foam or any other non-metallic material that has a high coefficient of friction. In one arrangement, grip strips 42 may be formed of the same material or a similar material as the lower layer chip strip 40. These grip strips 42 are generally rectangular in shape when viewed from an end and are adhered to the lower surface of track 12 and extend all or a portion of the length of track 12 from first end 24 to second end 26. The presence of grip strips 42 on the lower surface 34 of track 12 helps to impart friction on the workpiece 22 which helps to hold workpiece 22 in place during a cutting operation. Grip strips 42 may be adhered directly to a flat portion of the lower surface 34 of track 12. Alternatively, grip strips 42 may be adhered to a recess or groove in track 12 that is configured to receive grip strips 42. By placing grip strips 42 within recesses or along alignment features of track 12 helps to provide alignment for grip strips 42 as they extend along the length of track 12.

Glide Strip: In the arrangement shown, as one example, the upper surface 32 of track 12 includes one or more glide strips 44. Glide strips 44 are formed of any suitable size, shape and design and are configured to facilitate smooth gliding of the guide 16 of saw 14 over the upper surface 32 of track 12. In one arrangement, as is shown, glide strips 44 are formed of a material having a low coefficient of friction. Or, said another way, glide strips 44 are formed of a material that facilitates smooth and easy sliding of the guide 16 of saw 14 along the length of track 12. These glide strips 44 are generally rectangular in shape and are adhered to the upper surface of track 12 and extend all or a portion of the length of track 12 from first end 24 to second end 26. The presence of glide strips 44 on the upper surface 32 of track 12 helps to reduce friction between the lower surface of guide 16 of saw 14 and the upper surface of track 12. As such, the presence of one or more glide strips 44 helps to make it easier to make a cut using saw 14 and track 12 by reducing the friction between saw 14 and track 12. Glide strips 44 may be adhered directly to a flat portion of the upper surface of track 12. Alternatively, glide strips 44 may be adhered to a recess or groove in track 12 that is configured to receive glide strip 44. By placing glide strips 44 within recesses or along alignment features of track 12 helps to provide alignment for glide strips 44 as they extend along the length of track 12.

Structural Features: In the arrangement shown, as one example, in addition to having a generally flat upper surface 32 and a generally flat lower surface 34, and first protrusion 36 and second protrusion 38, track 12 includes any number of other structural features 46 in its upper surface 32, lower surface 34 or any other portion of the track 12. These structural features 46 may recess in or extend upward from the upper surface 32 and lower surface 34 of track 12. The recesses provided by these structural features 46 provides relief for aberrations in the surface of the workpiece as well as provides relief for the inevitable wood chips and other debris that is part of the woodworking process. These structural features 46 also provide additional structural strength and rigidity to track 12, much in the same way that corrugation provides strength to a sheet of metal.

Any other features of track 12 are hereby contemplated for use.

Saw & Guide:

In one arrangement, system 10 includes a saw 14 and guide 16. Saw 14 is formed of any suitable size, shape and design and is configured slide along track 12, with the help and guidance of guide 16 and facilitate cutting of workpiece 22. In the arrangement shown, as one example, saw 14 is a conventional electrically powered circular saw. However, any other form of a saw, or power tool for that matter, is hereby contemplated for use, such as a plunge cut saw, a router, a jigsaw, a grinder, a cutting wheel, or any other tool.

In the arrangement shown, as one example, guide 16 is connected to and/or incorporated within the lower side of saw 14 and facilitates guidance of saw 14 along track 12. Guide 16 is formed of any suitable size, shape and design and is configured engage track 12 in a mating fashion and slide along the length of track 12 while providing precise alignment to saw 14. In the arrangement shown, as one example, guide 16 is a generally rectangular member that is connected to the lower side of saw 14 and includes recesses (or alternatively protrusions) in its lower surface that mate with one or more protrusions 36 (or alternatively recesses) in the upper surface 32 of track 12 thereby providing guiding alignment to saw 14. The extended surface area of the lower side of guide 16 also helps to smooth the sliding of saw 14. In this way, guide 16 provides the interface between track 12 and saw 14, provides precise alignment of the saw 14 relative to the track 12, allows the saw 14 to be placed on the track 12 and removed from the track 12 with ease, and thereby helps form accurate cuts in an easy-to-use manner.

Measuring Bodies:

In the arrangement shown, as one example, system 10 includes one or more measuring bodies 18. Measuring bodies 18 are formed of any suitable size, shape and design and is configured to connect to track 12 and facilitate accurate measuring of narrow workpiece 22 while being easily installed, adjusted and removed from track 12 as well as being small in nature and easily portable and easy to store. In the arrangement shown, as one example, measuring bodies have a front side 50, a rear side 52, a top side 54, a bottom side 56, a left side 58 and a right side 60.

Housing: In the arrangement shown, as one example, measuring bodies 18 include a housing 62. Housing 62 is formed of any suitable size, shape and design and is configured to provide structural rigidity to the narrow stock rip guide cutting system 10 and facilitate attachment to track 12.

In the arrangement shown, as one example, housing 62 is formed of a single solid and unitary part to which other components of the system 10 are attached. Forming housing 62 of measuring bodies 18 out of a single unitary part increases the complexity of the manufacturing process, such as using complex molds and/or complex machining processes. However, forming housing 62 of measuring bodies 18 out of a single unitary part provides the benefit of reducing the number of parts, reducing the cost, maximizing the strength and rigidity of the measuring body 18, among many other benefits.

In one arrangement, housing 62 is formed of a plastic or composite material that is molded as a single component, such as through an injection molding process. However any other manufacturing method is hereby contemplated for use for housing 62 such as machining, casting, blow molding, or the like.

In an alternative arrangement, while housing 62 is shown formed out of a single unitary component, any number of components are hereby contemplated for use that are assembled together through a manufacturing and assembly process such as welding, gluing, adhering, snap-fitting, screwing, bolting, or the like. In one arrangement, housing 62 is formed of a pair of opposing housing halves that connect to one another along a seamline that extends along the middle of the measuring bodies 18 in a clamshell like manner. When these housing halves are connected to one another, housing 62 has a generally continuous exterior surface. As one example, opposing housing halves receive a plurality of fasteners that extend through one housing half and into the other housing half thereby connecting the opposing housing halves together to form a single assembled component.

In the arrangement shown, housing 62 of measuring bodies 18 includes a generally smooth and continuous exterior surface 64. When viewed from the side, measuring bodies 18 have a generally flat bottom side 56. In the arrangement shown, while the exterior surface 64 is generally smooth and continuous, meaning that the exterior surface 64 provides a closed surface, bottom side 56 of measuring bodies 18 is generally open and is formed of a plurality of structural members 65 separated by openings or spaces that form a web-like structure that provides strength and rigidity to housing 62 while minimizing material use. While the bottom side 56 of measuring bodies 18 is generally open and includes web-like structural members 65, the rearward lower surface 110 of bottom side 56 forms a generally flat planar surface that is configured to rest upon a work surface in a generally flat and flush arrangement (unless measuring body 18 is raised upward by track 12 and/or forward lower surface 114 being placed on a workpiece 22 that is thicker than the vertical height of step 112; or unless measuring body 18 is raised upward by the deployment of support member 18 extending downward from measuring body 18).

In one arrangement, when measuring bodies 18 are connected to track 12, the flat forward lower surface 114 of bottom side 56 extends in a generally parallel planar alignment to the generally flat lower surface 34 of track 12. In this way, when track 12 with attached measuring bodies 18 is placed on a workpiece 22, the lower surface of track 12 and forward lower surface 114 of bottom side 56 of measuring bodies 18 lie in a generally parallel planar alignment with the upper surface of workpiece 22. Similarly, when track 12 with attached measuring bodies 18 is placed on a workpiece 22, the rearward lower surface 110 of bottom side 56 of measuring bodies 18 lies in a generally parallel spaced alignment with the upper surface of workpiece 22, the spacing caused by step 112 between forward lower surface 114 and rearward lower surface 110.

Also, in the arrangement shown, when viewed from the side, measuring bodies 18 extend in a generally elongated fashion from their forward end to their rearward end, with their bottom side 56 extending in generally parallel spaced relation to their top side 54.

Also, in the arrangement shown, when viewed from the front side 50 or rear side 52, measuring bodies 18 are substantially narrower (from left side 58 to right side 60) than they are long (from front side 50 to rear side 52). Also, in the arrangement shown, when viewed from the front side 50 or rear side 52, measuring bodies 18 taper outwardly slightly as they extend downward and have a slightly curved or contoured exterior surface 64 that connects to the flat or planar bottom side 56.

Also, in the arrangement shown, when viewed from the top side 54 or the bottom side 56, measuring bodies 18 are substantially longer (from front side 50 to rear side 52) than they are wide (from left side 58 to right side 60). Also, in the arrangement shown, when viewed from the top side 54 or the bottom side 56 measuring bodies include a forward section 66, a middle section 68 and a rear section 70. In this arrangement, the forward section 66 is substantially wider than the middle section 68, the rear section 70 is substantially wider than the middle section 68, and the forward section 66 and rear section 70 are of approximate equal widths. In this way, the forward section 66, a middle section 68 and a rear section 70 form a generally dog-bone shape when viewed from above. However any other shape is hereby contemplated for use.

Having the rear section 70 be wider than the middle section 68 provides room for components of the system 10 as are described herein. Having the forward section 66 be wider than the middle section 68 provides room for components of the system 10 including connection section 72. Having the middle section 68 be narrower than forward section 66 and rear section 70 this provides a convenient and comfortable place for a user to grip the measuring body 18 and move it along track 12.

In the arrangement shown, housing 62 is generally symmetric along an imaginary middle line that extends through the middle of measuring bodies 18, from front side 50 to rear side 52. However any other shape is hereby contemplated for use.

Connection Section: In the arrangement shown, as one example, measuring bodies 18 include a connection section 72 positioned at their front side 50. Connection section 72 is formed of any suitable size, shape and design and is configured to facilitate connection to track 12, or more specifically to the upward facing T-slot of the second protrusion 38 adjacent the non-cutting edge 30 of track 12.

In the arrangement shown, as one example, the front side 50 of measuring body 18 includes a flange 74 that is configured to extend over the non-cutting edge 28 of track 12. More specifically, in the arrangement shown, flange 74 includes a generally flat lower surface 76 that is configured to engage the upper surface 32 of track 12 adjacent non-cutting edge 30 in a generally flat and flush manner that allows measuring body 18 to slide along track 12 so as to facilitate quick and easy placement of the measuring body 18 along the length of track 12. In the arrangement, shown, the rearward edge of lower surface 76 connects to a forward surface 78 that, in the arrangement shown, extends in approximate perpendicular alignment to the lower surface 76. Forward surface 78 is configured to engage the rearward surface of track 12 adjacent non-cutting edge 30 in a generally flat and flush manner that allows measuring body 18 to slide along track 12 so as to facilitate quick and easy and secure placement of the measuring body 18 along the length of track 12. In this way, the arrangement of lower surface 76 and forward surface 78 are sized and shaped to receive the upper surface and rearward surface of track 12 in a precise mating arrangement that facilitates precise and secure alignment as well as sliding of the measuring body 18 along the length of track 12.

In the arrangement shown, as one example, the lower surface 76 of flange 74 includes one or more (and in the arrangement shown, two) guides 80. Guides 80 are formed of any suitable size, shape and design and are configured to fit within the T-slot of the second protrusion 38 of track 12 adjacent the non-cutting edge 30. Guides 80 are configured to provide alignment of the measuring body 18 to the track 12 while also allowing the measuring body 18 to slide along the length of track 12. In the arrangement shown, as one example, when viewed from the side, guides 80 have a corresponding width as the upper section of the slot of the T-slot of the second protrusion 38 within close and tight tolerances while also allowing for sliding movement of the measuring body 18. In this way, guides 80 may be inserted within the T-slot of the second protrusion 38 thereby providing alignment of the measuring body 18 to the track 12.

In the arrangement shown, as one example, the flange 74 includes one or more (and in the arrangement shown, one) tightening member 82. Tightening members 82 are formed of any suitable size, shape and design and are configured to facilitate tightening the measuring bodies 18 in place along the length of track 12. In the arrangement shown, as one example, tightening members 82 include a fastener 84 having a head 86 and threaded shaft 88 that connects to a nut 90. Tightening member 82 also includes a knob 92 that facilitates quick and easy manual tightening and loosening. In the arrangement shown, threaded shaft 88 of tightening member 82 extends through a hole 94 in flange 74, which is spaced just outward from a guide 80. In the arrangement shown, threaded shaft 88 extends through hole 94 of flange 74 and connects at its lower end to nut 90. Nut 90 is sized and shaped to fit within the lower, wider, section of the T-slot of second protrusion 38. Nut 90 is sized and shaped to slide along the lower, wider, section of the T-slot of second protrusion 38 while being too large to pull through the upper, narrower, section of the T-slot of second protrusion 38. In this way, when nut 90 is positioned within the lower section of the T-slot of second protrusion 38 and connected to the threaded shaft 88 of tightening member 82 and tightening member 82 is loose, this allows measuring body 18 to slide along the length of track 12. In contrast, when nut 90 is positioned within the lower section of the T-slot of second protrusion 38 and connected to the threaded shaft 88 of tightening member 82 and tightening member 82 is tight, this pulls nut 90 into frictional engagement with the narrower, upper, section of the T-slot of the second protrusion 38 thereby locking the measuring body 18 in place.

In the arrangement shown, as one example, to provide increased alignment and improved sliding of the measuring bodies 18 along the length of track 12, when viewed from above or below, the width of flange 74 and forward surface 78 of connection section 72 is elongated (from left side 58 to right side 60) and is wider than the rearward positioned middle section 68 of measuring bodies 18. This increased side-to-side width of flange 74 and lower surface 76 and forward surface 78 provides increased surface area of the lower surface 76 and forward surface 78 that engages the upper surface 32 of track 12 and the rearward non-cutting edge 30, respectively, which improves sliding and alignment. Improved alignment of the measuring bodies 18 facilitates increased accuracy when cutting workpiece 22.

In the arrangement shown, guides 80 are positioned on each side of holes 94 and extend from hole 94 to the outward edges of measuring body 18. Also, in the arrangement shown, when viewed from below, the guides 80 have generally flat and straight forward and rearward walls that extend in approximate parallel spaced relation to one another, which correspond to the width of the upper portion of the T-slot of the second protrusion 38 of track 12. Also, in the arrangement shown, when viewed from below, forward and rearward walls of guides extends in a generally perpendicular alignment to the forward-to-back length of measuring body 18.

Also, in the arrangement shown, when viewed from below, the inward edges of guides 80 (adjacent hole 94) extends in a generally perpendicular alignment to the forward and rearward walls of guides 80. When nut 90 is square in shape, or has at least one flat side, these perpendicular inward edges of guides 80 engages and aligns nut 90 in the proper alignment to fit within the T-slot of second protrusion 38 of track 12. In the arrangement shown, when viewed from below, a space is positioned between the forward wall and rearward wall of guides 18.

In the arrangement shown, as one example, only a single tightening member 82 is positioned at the approximate side-to-side center of connection section 72. This arrangement allows for quick locking of the measuring body 18 to track 12 as only a single knob 92 must be tightened. However, to improve alignment and increase locking force and to provide redundancies, two spaced-apart tightening members 82 are used in connection section 72. Alternatively three tightening members 82 may be used, or any other number of tightening members 82 or configuration of tightening members 82 are hereby contemplated for use.

Measuring Bar: In the arrangement shown, measuring bodies 18 house and hold a measuring bar 20. Measuring bar 20 is formed of any suitable size, shape and design and is configured to facilitate quick, easy and accurate cutting of the width of workpiece 22 to perform a cutting operation using track 12. In the arrangement shown, as one example, measuring bar 20 is a generally rectangular member that extends a length from a forward end 96 to a rearward end 98 and extends a height between an upper surface 100 and a lower surface 102, and extends a width between opposing sides 104.

In the arrangement shown, as one example, while measuring bar 20 is generally rectangular in shape, when viewed from an end, measuring bar 20 is generally T-shaped, with a step-in at the lower corners of measuring bar 20 and with a slight recess in the lower surface 102 and a slight recess in the upper surface 100, however any other shape is hereby contemplated for use. With respect to the arrangement shown, these features, the T-shaped member with step-ins at the lower corners, the slight recess in the upper surface 100 and lower surface 102, provide structural strength and rigidity to measuring bar 20, much in the same way that corrugation provides strength to a sheet of metal. These features also help to provide guidance and alignment to measuring bar 20 as it slides in and out of housing 62 of measuring body 18. Measuring bar 20 slides in and out of an opening 106 or slot in the rear side 52 of housing 62 that is similarly sized and shaped to the peripheral shape of measuring bar 20. In the arrangement shown, as one example, the lower side of this opening 106 is open so as to allow the lower surface 102 of measuring bar 20 to be in flat and flush alignment with the lower surface of housing 62.

In the arrangement shown, as one example, the upper surface 100 of measuring bar 20 includes measuring indicia 108 thereon. Measuring indicia 108 are any markings or other visual and/or electronically perceptible indications that indicate the length or width of the measurement. In one arrangement, measuring indicia 108 may include numbers as well as hash-marks that indicate portions of number. When using the imperial system, measuring indicia 108 may include markings such as 1 inch, ½ inch, ⅓ inch, ¼ inch, ⅛ inch, and 1/16 inch, or any other marking; when using the metric system markings may include centimeter markings, as well as every tenth of a centimeter. In one arrangement, one side of measuring bar 20 includes imperial markings and the other side of the measuring bar 20 includes metric markings. Any other form of markings are hereby contemplated for use as measuring indicia 108.

In one arrangement, measuring indicia 108 reside within the slight recess in the upper surface 100 of measuring bar 20, which provides some cover and shelter to the markings. In one arrangement, measuring indicia 108 are painted on, marked on, engraved in, etched in, or otherwise attached directly to or in measuring bar 20. Indicia 108 may be grooves, protrusions or other features on or in a surface of measuring bar 20. In an alternative arrangement, measuring indicia 108 are formed on part of a tape, strip or other device or object that is attached directly to measuring bar 20. To be clear, indicia 108 may be electronically perceptible features, such as magnetic features, digital markings or any other indicia that may be used by an electronic device to determine a measurement therefrom.

In one arrangement, measuring indicia 108 accommodate the length or distance between the cutting edge 28 (or the outward edge of chip strip 40) of track 12 and the rear side 52 of measuring body 18. That is, the measuring indicia 108 at or around the rearward end 98 of measuring bar 20 begin at zero and increase as they move toward the forward end 96 of measuring bar 20. In this way, the further measuring bar 20 is slid forward under housing 62, the narrower the cut on workpiece 22. As such, in this way, measuring indicia 108 provides a numerical indication of the width of cut of workpiece 22.

When viewed from the side, the lower surface 102 of measuring bar 20 is in generally flat and flush alignment with the rearward lower surface 110 of housing 62. The forward end of rearward lower surface 110 connects to a step 112, which extends upward a distance before connecting to the forward lower surface 114. The height of step 112 is approximately the height of measuring bar 20. Step 112 essentially defines the maximum measurable width of workpiece 22 using measuring body 18. In use, as the forward end 96 of measuring bar 20 extends forward from step 112 this shortens the measured width of cut of workpiece 22. Rearward lower surface 110 and forward lower surface 114 extend in approximate parallel planar spaced relation to one another. Rearward lower surface 110 and forward lower surface 114 extend in approximate perpendicular planar relation to one the surface of step 112.

In the arrangement shown, as one example, the lower surface 102 of measuring bar 20 is in approximate flat and flush alignment with the rearward lower surface 110. As the step 112 is approximately the height of measuring bar 20, the upper surface 100 of measuring bar 20 is in approximate flat and flush alignment with the forward lower surface 114.

As the forward end 96 of measuring bar 20 extends forward past connection section 72, measuring bar 20 extends under track 12. In this way, when the forward end 96 of measuring bar 20 extends forward past connection section 72 measuring bar 20 provides under-track width measurements of workpiece 22.

In the arrangement shown, as one example, measuring bar 20 is a single monolithic components that extends in an uninterrupted continuous manner from forward end 96 to rearward end 98. In addition, measuring bar 20 extends in a generally flat and straight manner from forward end 96 to rearward end 98. In doing so, measuring bar 20 provides optimally accurate measurement between the range of narrowest to widest cuts as there are no moving parts on measuring bar 20 and measuring bar 20 slides through housing 62 in a straight manner.

Increased accuracy of measuring bar 20 is also provided by calibration member 116.

Calibration Member: In the arrangement shown, measuring bodies 18 house and hold a calibration member 116. Calibration member 116 is formed of any suitable size, shape and design and is configured to facilitate quick, easy and accurate fine-tuning of the measuring indicia 108 of measuring bar 20 to the length of cut of workpiece 22. In the arrangement shown, as one example, calibration member 116 includes an adjustable member 118 that is connected adjacent the rearward end of rear section 70 of housing 62 of measuring body 18. Adjustable member 118 is configured to move or slide a distance along the forward to back length of measuring body 18 and measuring bar 20 so as to adjust the position of adjustable member 118 with respect to housing 62 of measuring body 18.

Adjustable member is formed of any suitable size shape and design. In the arrangement shown, as one example, adjustable member 118 includes a first section 120 that connects to a second section 122, and extends a length from a forward end 124 to a rearward end 126, and extends a width between opposing sides 128.

In the arrangement shown, as one example, when viewed from the rearward side of measuring body 18, first section 120 of adjustable member 118 has a generally T-shaped body having a generally flat upper surface 130 that connects to a narrower neck section 132 below upper surface 130. The narrower neck section 132 connects first section 120 to second section 122. In the arrangement shown, as one example, when viewed from the rearward side of measuring body 18, second section 122 of adjustable member 118 has a generally curved upper surface 134 and a generally flat lower surface 130.

In the arrangement shown, as one example, the T-shaped first section 120 is received within a slot 138 in the rearward end of housing 62 of measuring body 18. The engagement of first section 120 in slot 138 allows adjustable member 118 to slide a forward-to-back back distance, while constraining other movement of adjustable member 118. Slot 138 is positioned directly above slot 106 that is receives measuring bar 20 therein.

In the arrangement shown, as one example, second section 122 extends downward and rearward from first section 120. In this way, second section 122 is positioned just above the upper surface 100 of measuring bar 20.

In one arrangement, at least the second section 122, or alternatively the entire adjustable member 118, is made of a transparent, translucent or other material that allows the user to see-through the second section 122. In this arrangement, the flat lower surface 136 of second section 122 is positioned within close proximity of the upper surface 100 of measuring bar 20. This allows a user to see through the second section 122 of adjustable member 118 to make a reading on measuring bar 20.

In one arrangement, to make a precise reading, a reference point 140 is positioned on or in the second section 122 that indicate the precise position that a reading of measuring indicia 108 should be read. In the arrangement shown, as one example, reference point 140 is a colored (red, blue, white, black or otherwise) line that extends from side 128 to side 128 across second section 122. In the arrangement shown, as one example, wherein second section 122 is transparent, translucent or made of another see-through material, the curved upper surface 134 of second section 122 may have a magnifying effect, which can make it easier to make a reading, and more accurate to make a reading.

In an alternative arrangement, instead of second section 122 being formed of a transparent, translucent or other see-through material, second section 122 is formed of an opaque material. In this arrangement, an edge, such as the rearward edge of second section 122 is used as the reference point 140. In an alternative arrangement, when second section 122 is formed of an opaque material, a point on the second section 122 (such as a pointer-arrow) is used as the reference point 140. In an alternative arrangement, when second section 122 is formed of an opaque material, a feature, such as a line or an edge, in an opening in second section 122 is used as the reference point 140.

Once adjustable member 118 is slid to the desired, calibrated, position, wherein the reading at reference point 140 of the measuring indicia 108 on the upper surface 100 of measuring bar 20 is an accurate reading of the distance of the width of cut on workpiece 22, the adjustable member 118 is fixed in place. Adjustable member 118 may be fixed in place by any manner, method or means. In the arrangement shown, as one example, adjustable member 118 is fixed in place once set to the desired position by a fastener 142 having a head 144 and a threaded shaft 146 that extends through a hole 148 in the housing 62 of measuring body 18. As the threaded shaft 146 extends through the hole 148 of housing 162 the lower end of threaded shaft 146 engages the flat upper surface 130 of first section 120 thereby forcing adjustable member 118 downward within slot 138 and locking adjustable member 118 in place.

In an alternative arrangement, fastener 142 threads into the upper surface 130 of first section 120 of adjustable member 118 thereby pulling adjustable member 118 upward into engagement with housing 62 of measuring body 18. In this arrangement, the threaded shaft 146 of fastener 142 extends through a slot in measuring body 18 thereby allowing for forward-to-back movement of fastener 142 with respect to measuring body 18.

To adjust or recalibrate adjustable member 118, fastener 142 is loosened, thereby separating the lower end of threaded shaft 146 from the upper surface 130 of first section 120, thereby allowing adjustable member 118 to be slid forward-to-back within slot 138. Once adjustable member 118 reaches the desired position, fastener 142 is again tightened thereby causing locking engagement between the lower end of threaded shaft 146 and the upper surface 130 of first section 120.

Calibration Procedure: In one arrangement, measuring body 18 is calibrated in the following manner. First, measuring body 18 is securely attached to track 12. Next, fastener 142 is loosened thereby allowing adjustable member 118 to be adjusted. Next, measuring bar 20 is moved to a known position. In one arrangement, measuring bar 20 is moved all the way forward until the forward end 96 of measuring bar 20 is in flat and flush alignment with the cutting edge 28 of chip strip 40. In this position, the reference point 140 should be precisely aligned with the "Zero" mark on measuring indicia 108 of measuring bar 20. If it does not, adjustable member 118 is slid, forward or backward, within slot 138 to precisely align reference point 140 of second section 122 to align with the known position. Once adjustable member 118 is moved to the desired, calibrated, position, fastener 142 is again tightened thereby locking adjustable member 118 in the calibrated position. Now that adjustable member 118 has been calibrated, measuring bar 20 can be moved to any position along its length and reference point 140 should accurately read the distance between cutting edge 28 of chip strip 40, also known as the cut width on workpiece 22.

Locking Member: In the arrangement shown, measuring bodies 18 house and hold a measuring bar 20 that is allowed to slide within measuring body 18 in a forward-to-back manner thereby setting the width of cut of workpiece 22. Once measuring bar 20 is set to the desired position, or width of cut of workpiece 22, it is desirable to lock measuring bar 20 in place. To facilitate locking of measuring bar 20 in place once set to a desired position, measuring body 18 includes a locking member 150. Locking member 150 is formed of any suitable size, shape and design and is configured to facilitate quick, easy and accurate locking of measuring bar 20 in place so as to set the length of cut of workpiece 22. This is especially important for making repeated cuts at the same width.

In the arrangement shown, as one example, locking member 150 is positioned within rear section 70 and includes a pair of opposing arms 152, one positioned on each side 104 of measuring bar 20. In the arrangement shown, as one example, when viewed from forward or rearward side, arms 152 have a generally L-shaped profile that is sized and shaped to cradle and hold the generally T-shaped profile of measuring bar 20. That is, the L-shaped arms essentially form a portion of slot 106 that holds and supports and allows measuring bar 20 to slide there through.

Figure 11:
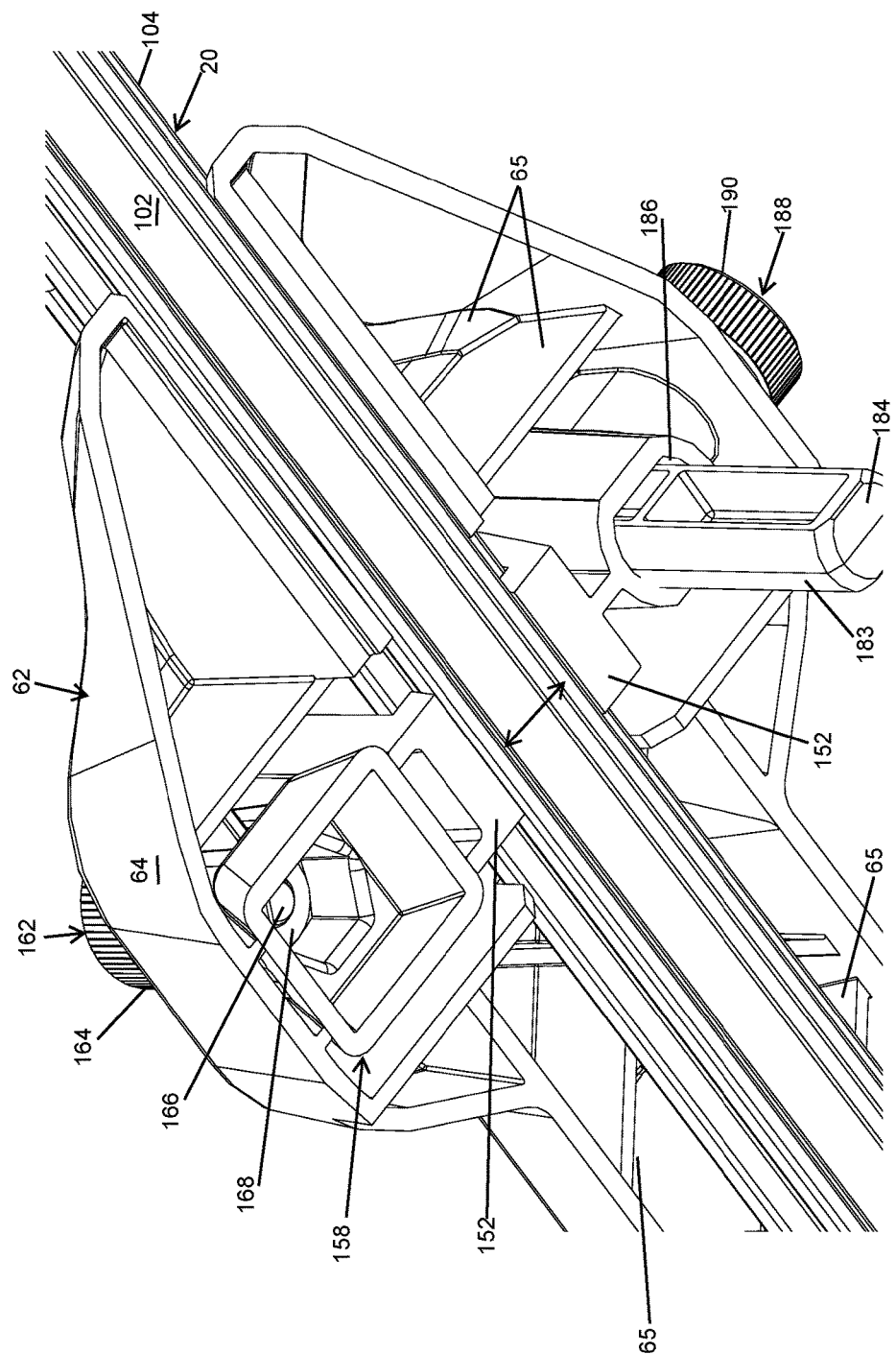
FIG. 11 is a close-up bottom perspective view of the narrow stock rip guide cutting system shown in FIG. 1, the view showing the wedge in engagement with the measuring body and causing locking engagement of the arms of the measuring body onto the measuring bar.
Figure 12:
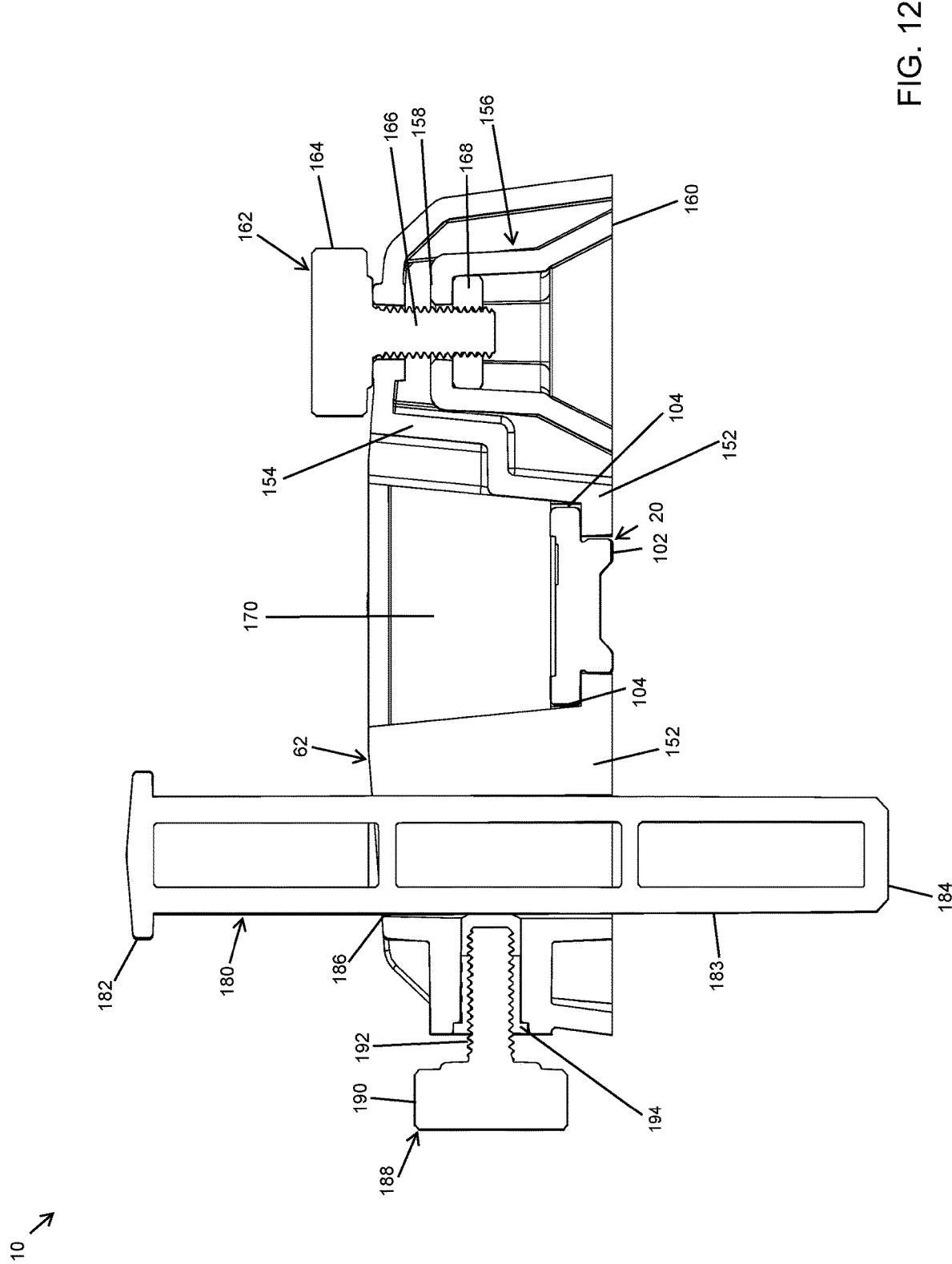
FIG. 12 is a section cut-away elevation view of the narrow stock rip guide cutting system shown in FIG. 1, the view showing a cut that extends perpendicular to the length of the measuring body, the cut centered on the center of the wedge of of the locking member and the center of the support member.
Figure 13:
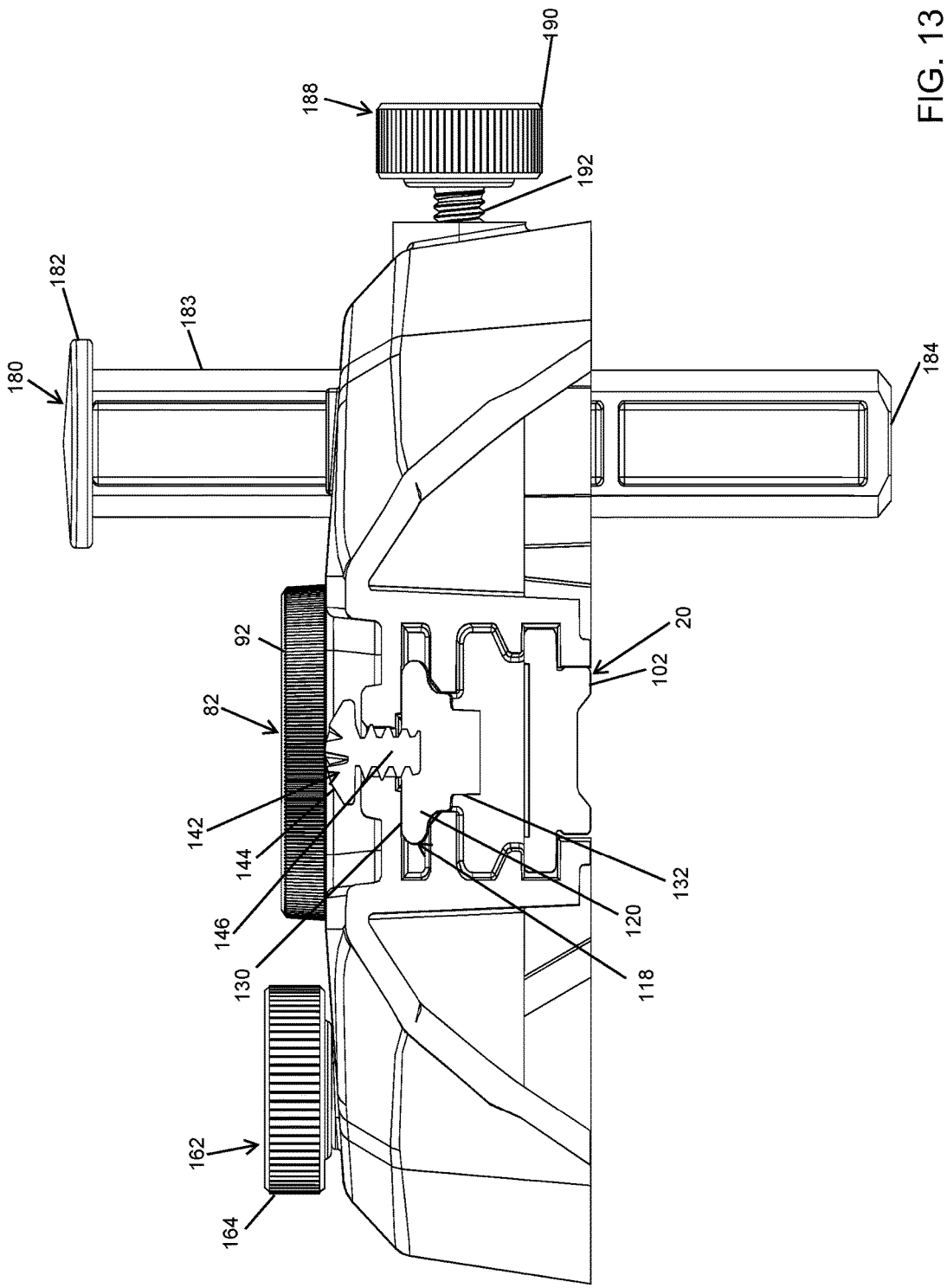
FIG. 13 is a section cut-away elevation view of the narrow stock rip guide cutting system shown in FIG. 1, the view showing a cut that extends perpendicular to the length of the measuring body, the cut centered on the center on the fastener of the calibration member.
Figure 14:
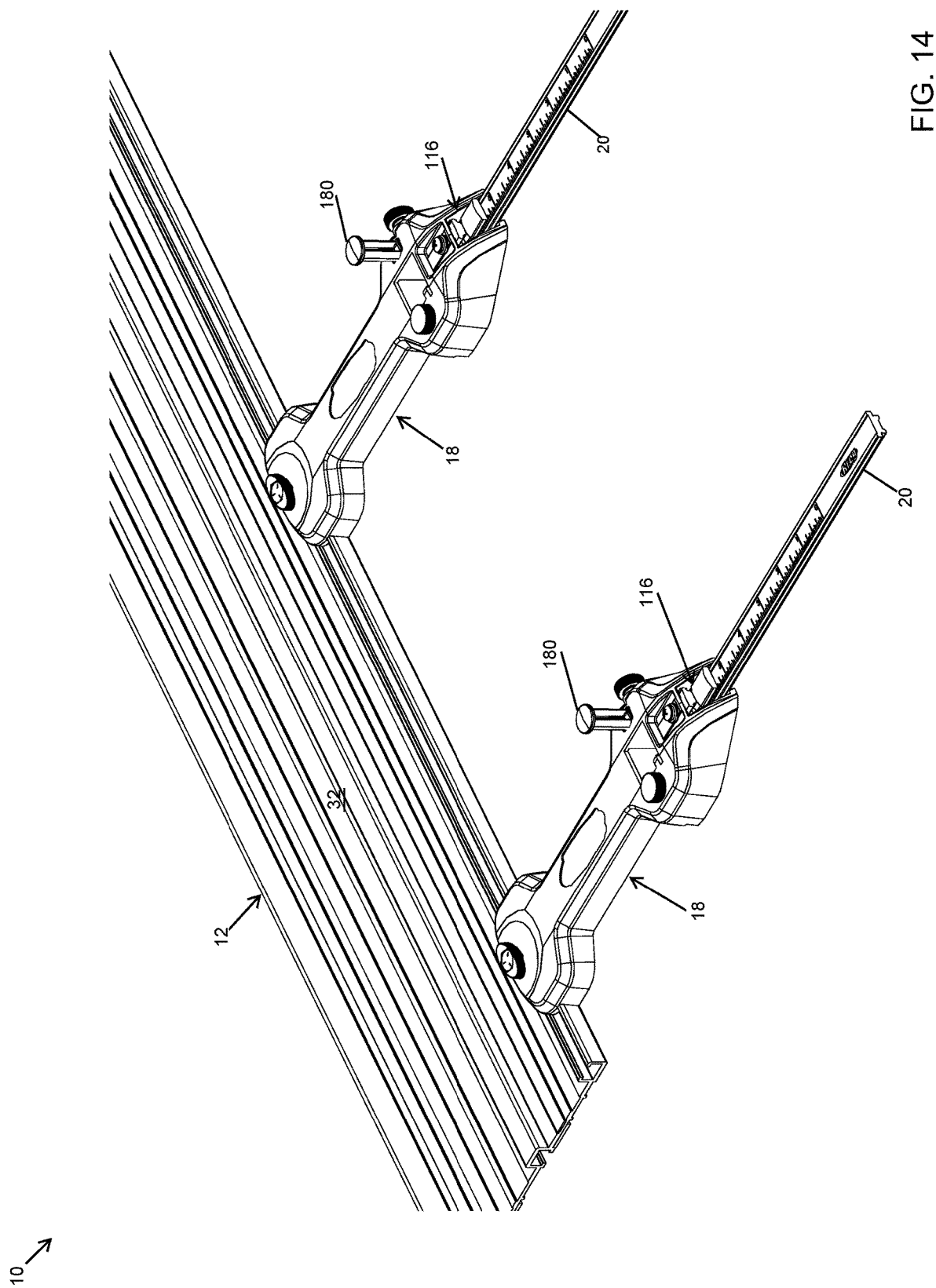
FIG. 14 is a perspective view from the rear left top side of a narrow stock rip guide cutting system, the view showing the a pair of measuring bodies, as is shown in FIG. 1, connected at their front side to a non-cutting side of a track, the view showing the measuring bar extending outward from the rear side of the measuring bodies.
Figure 15:
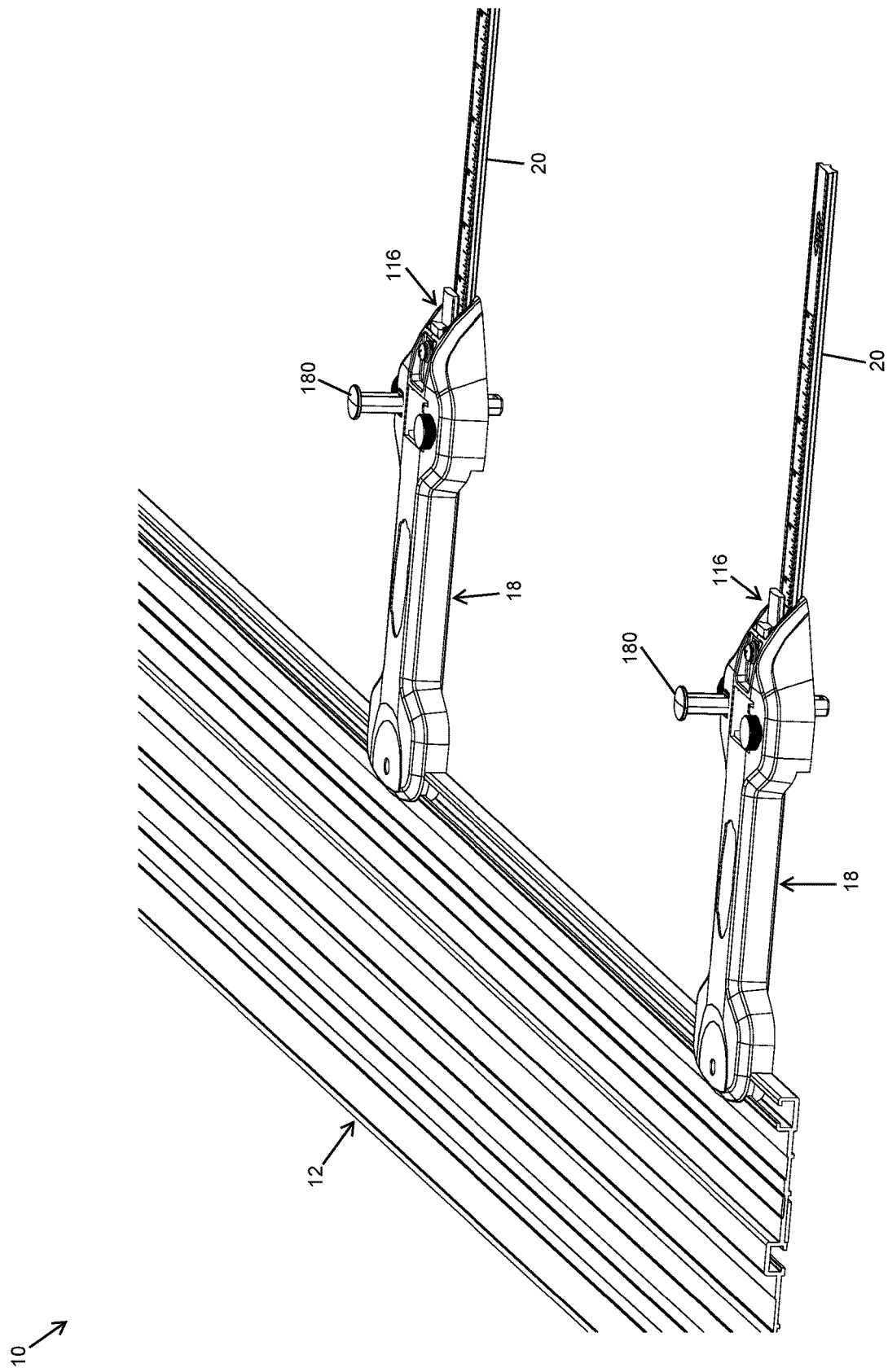
FIG. 15 is another perspective view of the configuration shown in FIG. 14 from a slightly different angle.
Figure 16:
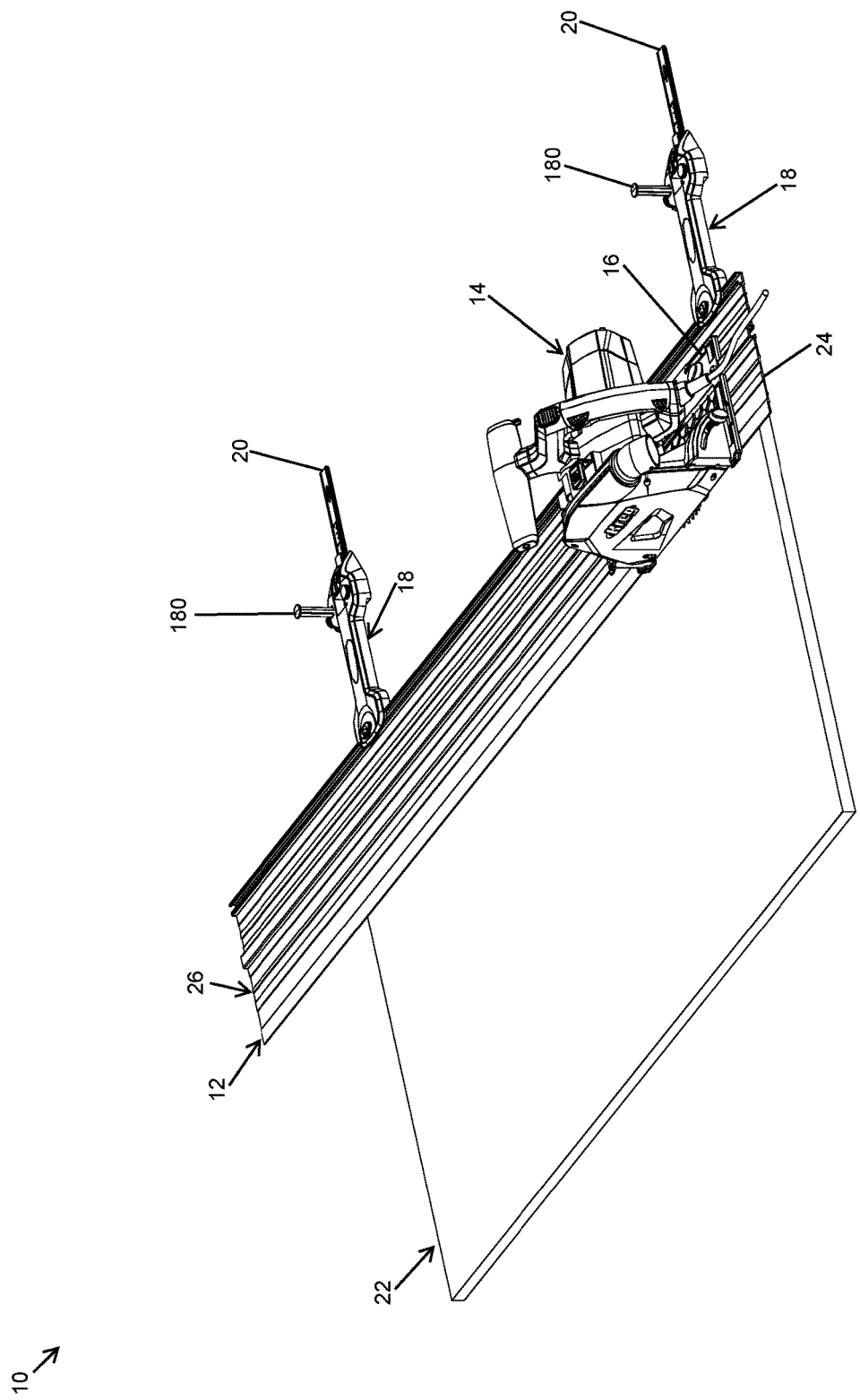
FIG. 16 is a perspective view from the front left top side of a narrow stock rip guide cutting system, the view showing the a pair of measuring bodies, as is shown in FIG. 1, connected at their front side to a non-cutting side of a track, the view showing the measuring bar extending outward from the rear side of the measuring bodies, the view showing the track placed on a workpiece, the view showing a saw placed on the track.
Figure 17:
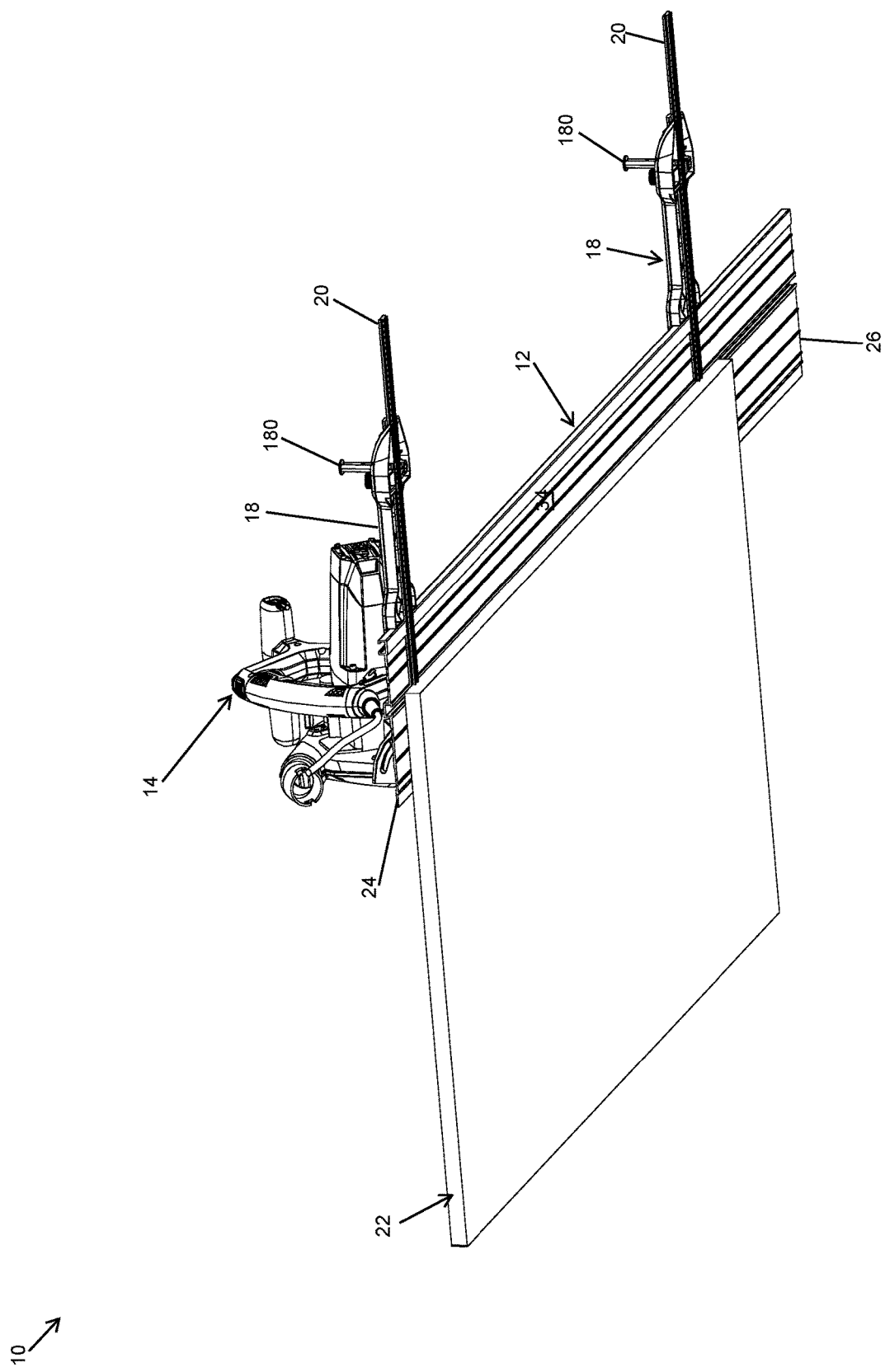
FIG. 17 is another perspective view of the configuration shown in FIG. 16 from a slightly different angle, the angle from the rear left bottom side of the narrow stop rip guide cutting system.
Figure 18:
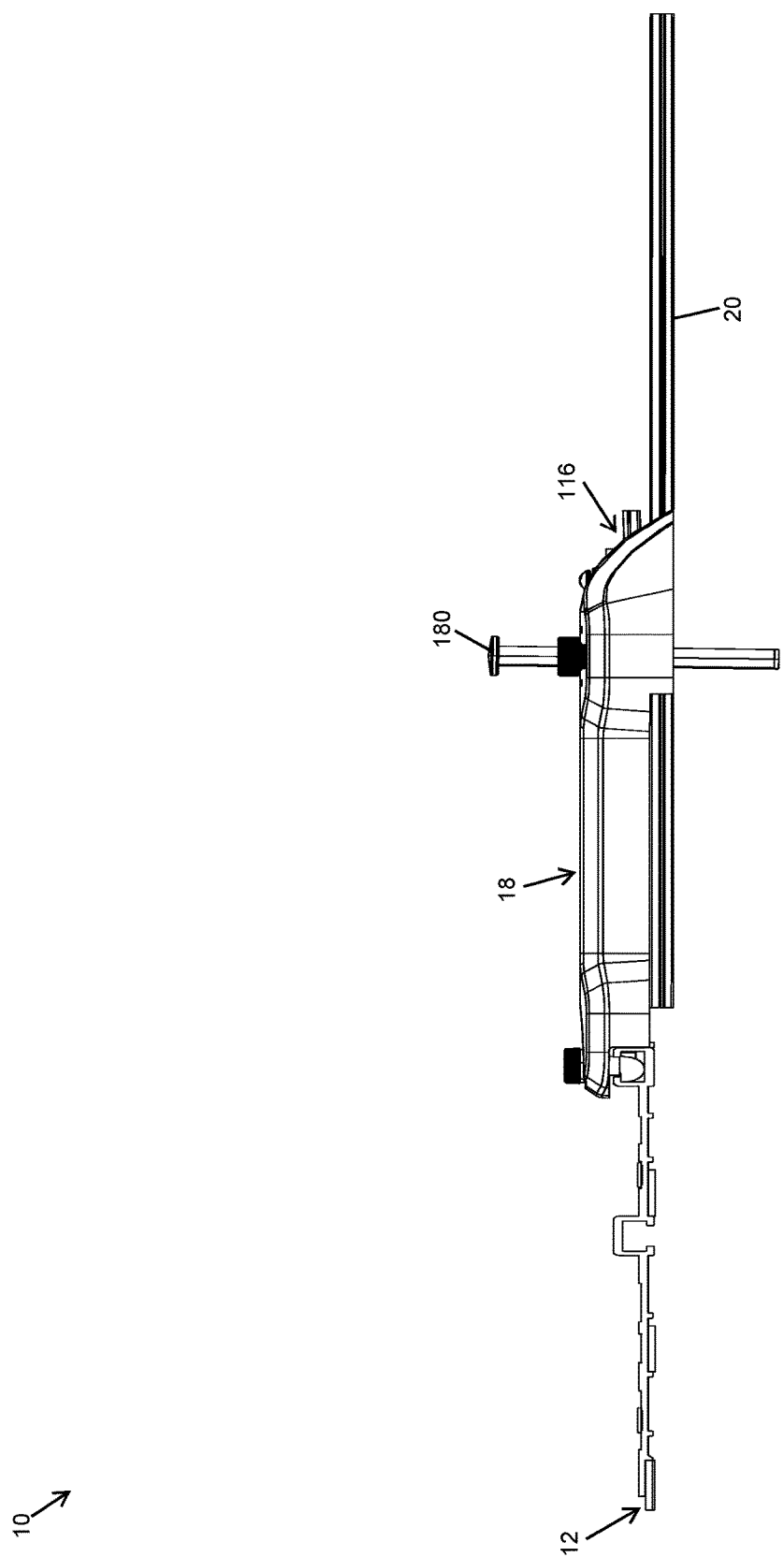
FIG. 18 is a side elevation view of a narrow stock rip guide cutting system having an alternative manner of connecting measuring body to the track, the view showing a snap feature that connects the measuring body to a track of the non-cutting side of the track, the view showing the a measuring body, as is shown in FIG. 1 with the addition of a snap feature, connected at its front side to a non-cutting side of a track, the view showing the measuring bar extending outward from the rear side of the measuring body, the view showing the measuring bar extending under the measuring body.
Figure 19:
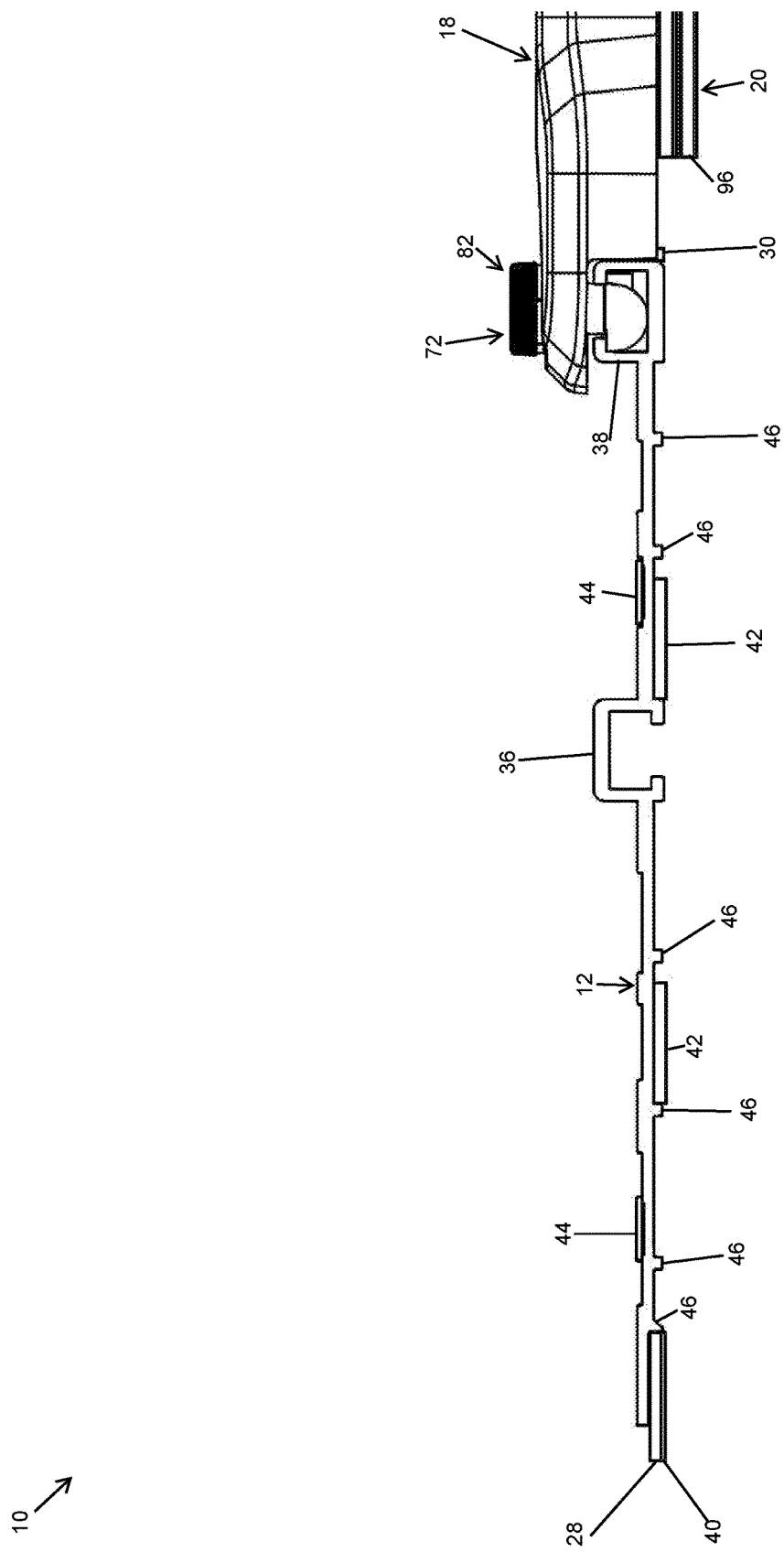
FIG. 19 is a close-up view of the track and front side of the measuring body with a snap feature as is shown in FIG. 18.
Figure 20:
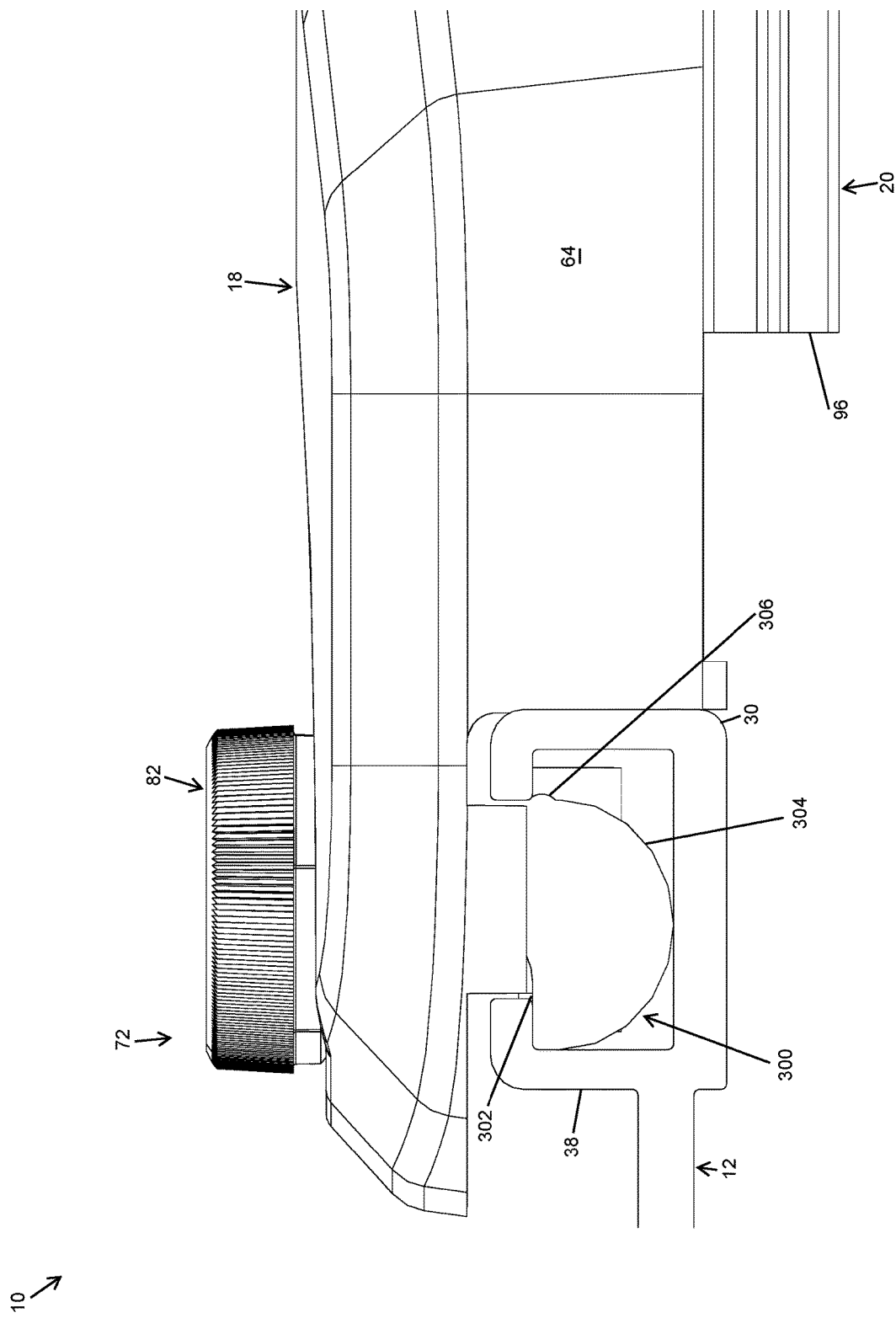
FIG. 20 is an even closer-up view of the track and front side of the measuring body as is shown in FIG. 19, the view showing the snap feature positioned within the T-slot in the non-cutting side of the track.
Figure 21:
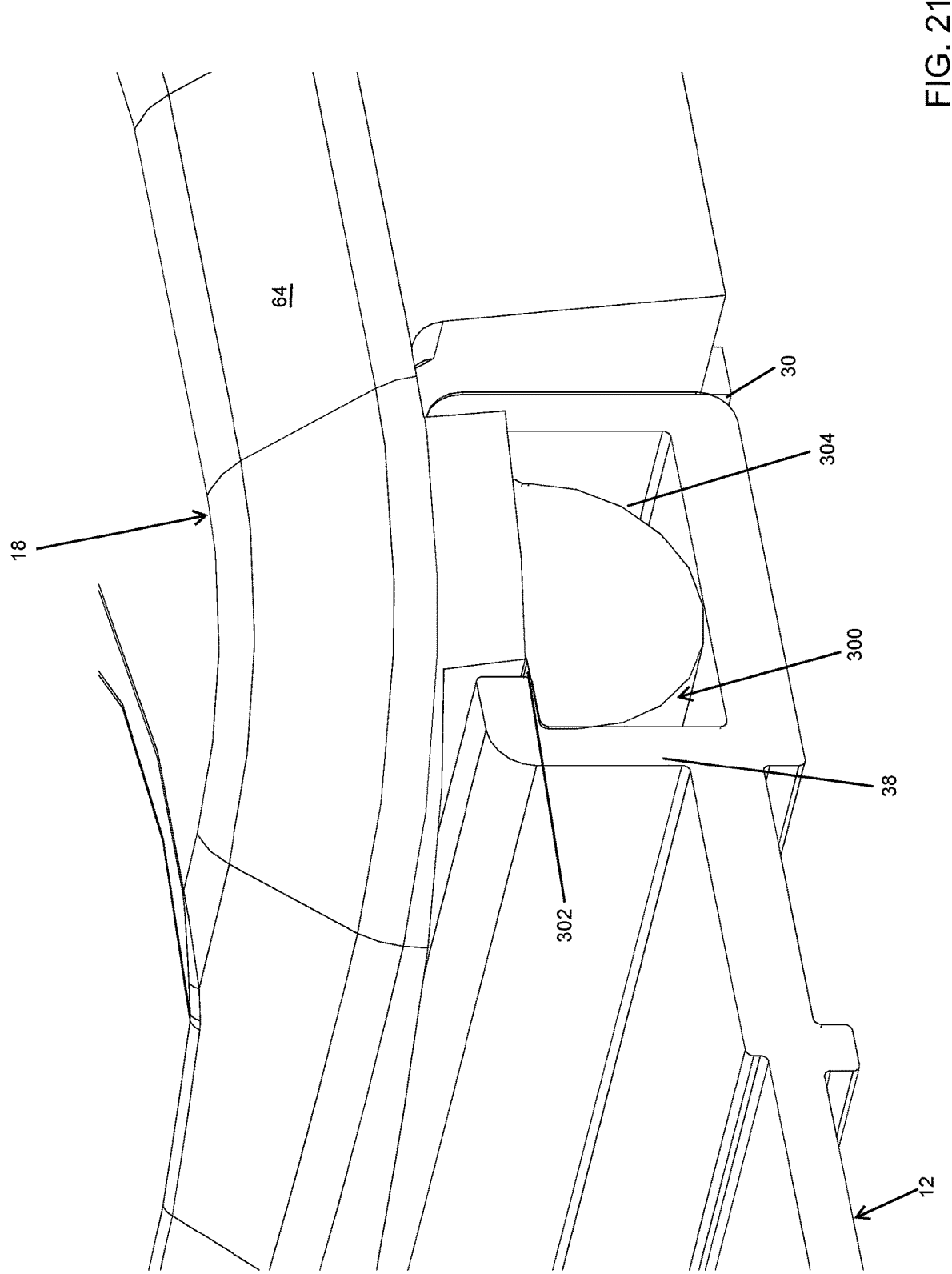
FIG. 21 is a perspective view of the track and front side of the measuring body as is shown in FIG. 20, the view showing the snap feature positioned within the T-slot in the non-cutting side of the track.
Figure 22:
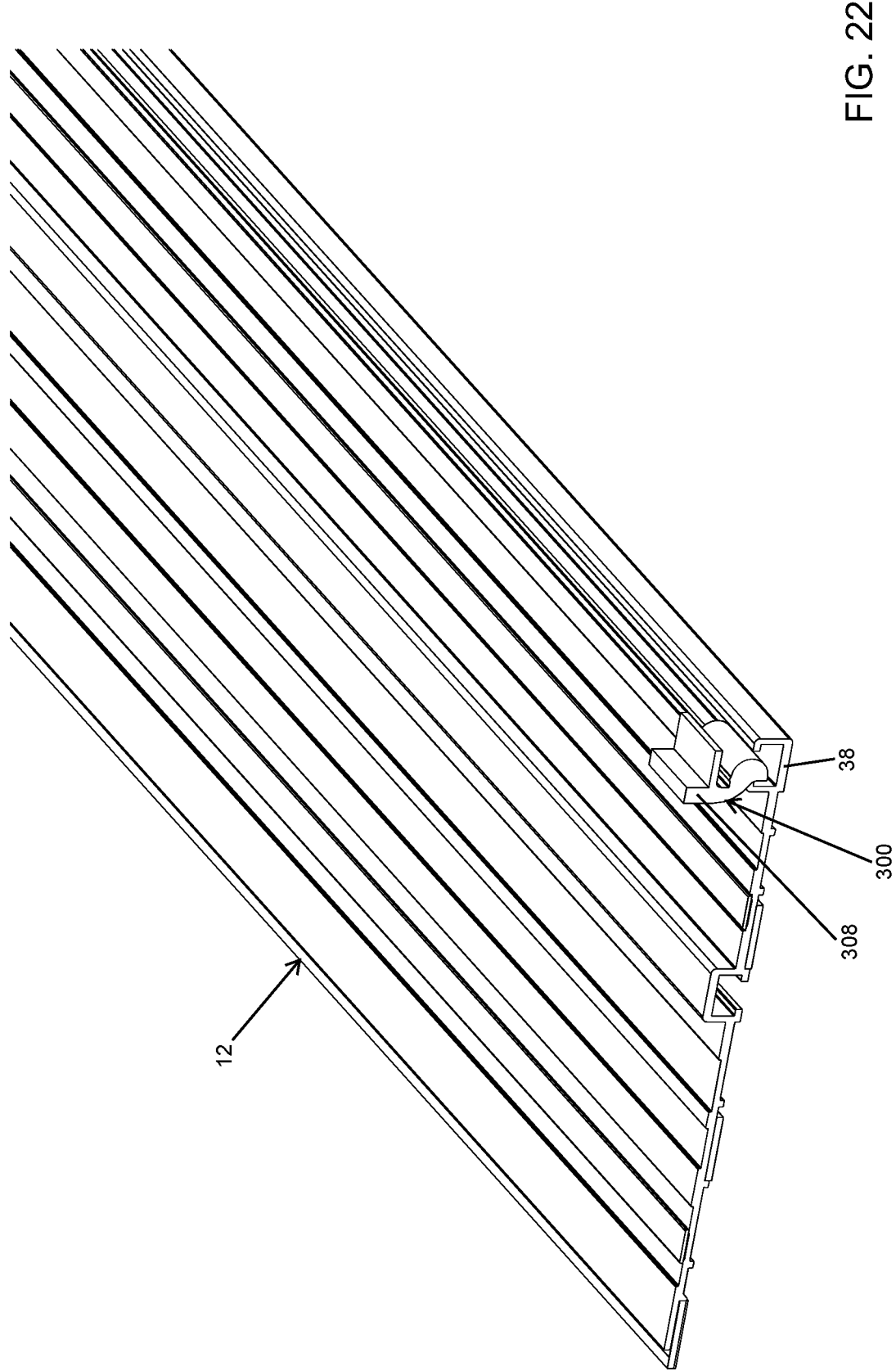
FIG. 22 is a perspective view of the snap feature as is shown in FIG. 21, the view showing the snap feature positioned in a raised position in the track in the non-cutting side of the track.
Figure 23:
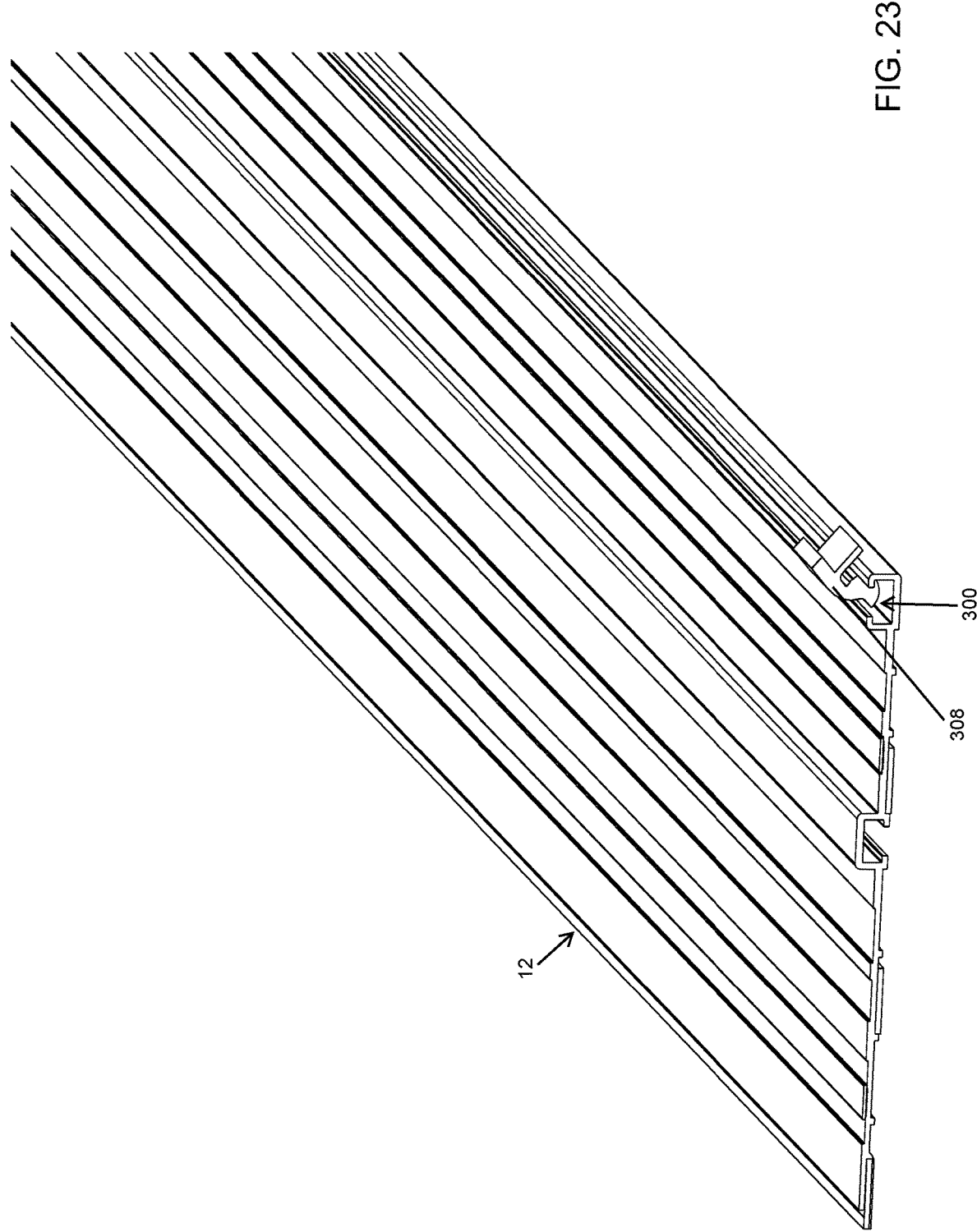
FIG. 23 is a perspective view of the snap feature as is shown in FIG. 22, the view showing the snap feature positioned in a partially lowered position in the T-slot in the non-cutting side of the track.
Figure 24:
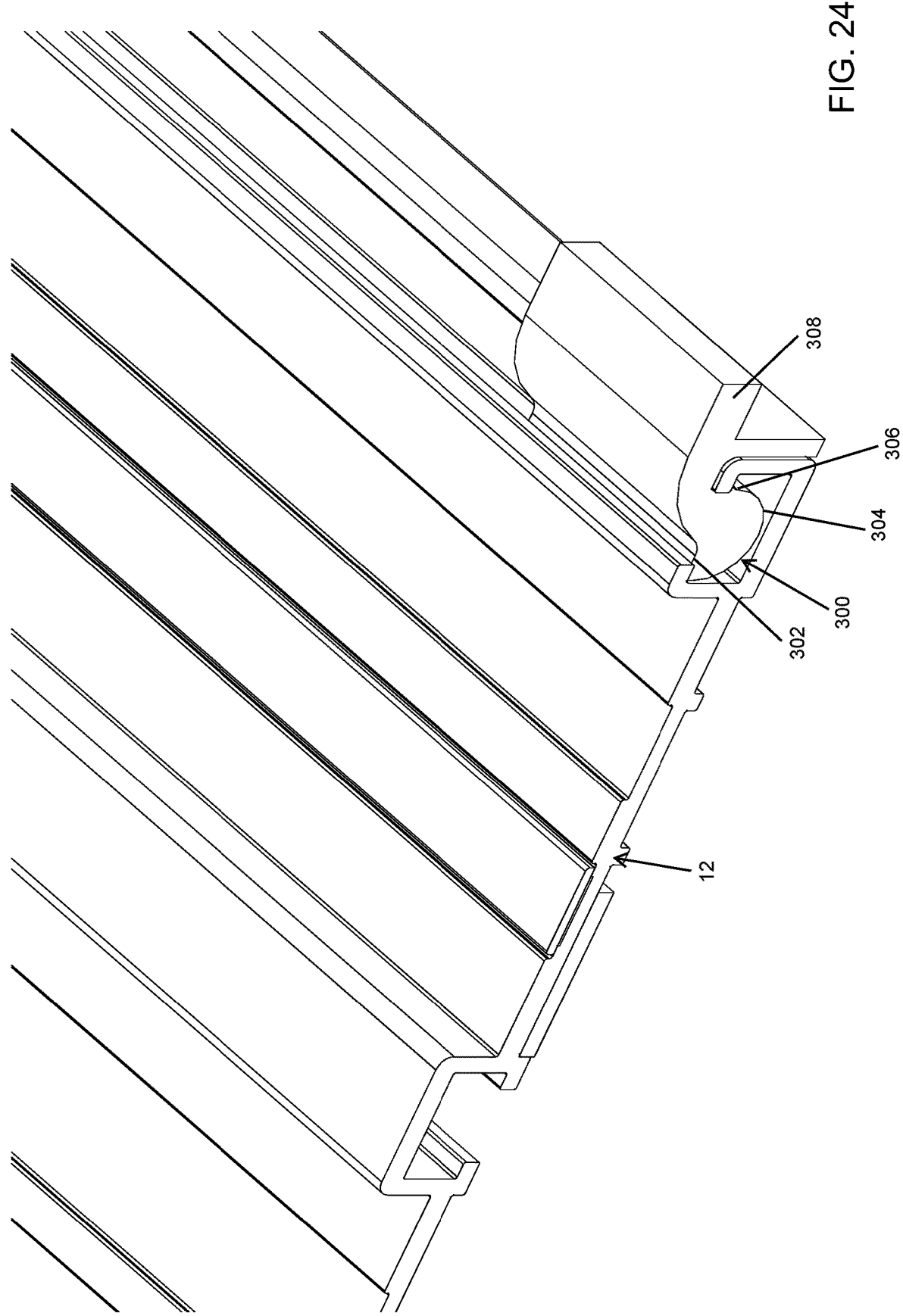
FIG. 24 is a perspective view of the snap feature as is shown in FIG. 23, the view showing the snap feature positioned in a fully lowered and snapped-in position in the T-slot in the non-cutting side of the track.

Opposing arms 152 are configured to work in concert with one another and selectively allow measuring bar 20 to freely slide there between when in an unlocked position, and selectively hold measuring bar 20 when in a locked position. In the arrangement shown, as one example of accomplishing this goal, with particular reference to FIG. 11 and FIG. 12, one arm 152 is a generally fixed arm, meaning that it is relatively rigidly attached to housing 62 of measuring body 18 and is generally non-movable in nature, and the other arm 152 is generally movable in nature to facilitate clamping or locking of measuring bar 20. With reference to FIG. 12, the rigidly affixed arm 152 is positioned on the left side of the measuring bar 20. If pressed, this arm 152 remains in a relatively stationary position. In contrast, the generally movable arm 152 is positioned on the right side of measuring bar 20. In the arrangement shown, as one example, the movable arm 152, on the right side of measuring bar 20, is connected adjacent its upper end 154 to housing 62 of measuring body 18. This allows the lower end of this arm 152 to be relatively free to allow movement. In this way, the lower end of this arm 152 hinges upon the connection at its upper end 154 to other components of housing 62 of measuring body 18. In their natural position, the opposing arms 152 are spaced apart from one another so that they hold measuring bar 20 there between, but allow relatively free or easy movement of measuring bar 20 so that when in an unlocked state a user can quickly, easily and accurately adjust measuring bar 20 to their desired position. In contrast, when in a locked position, arms 152 move toward one another thereby compressing upon the sides 104 of measuring bar 20.

In the arrangement shown, as one example, a wedge 156 is used to facilitate movement of the free arm 152 toward the fixed arm 152, however any other arrangement or configuration is hereby contemplated for use in locking the position of measuring bar 20 in place. Wedge 156 is formed of any suitable size, shape and design and is configured to facilitate movement of the free arm 152 toward the fixed arm 152. In the arrangement shown, as one example, wedge 156 is positioned underneath measuring body 18, or, said another way, within the hollow or open underside of housing 62 and extends vertically between an upper end 158 and a lower end 160. In the arrangement shown, as wedge 156 extends downward, wedge 158 angles outward; or, said another way, the lower end 160 of wedge 156 is wider than the upper end 158 of wedge 156.

In the arrangement shown, as one example, wedge 156 is connected to housing 62 of measuring body 18 by a fastener 162 having a head or knob 164 that connects to a threaded shaft 166. In this arrangement, threaded shaft 166 of fastener 162 extends through a hole 167 in the exterior surface 64 of housing 62 of measuring body 18 and through the upper end 158 of wedge 156 and connects to a nut 168 that is itself held within and/or under the hollow interior of wedge 156. In this way, when fastener 162 is rotated in a first direction, a tightening direction, wedge 156 is drawn further upward into the underside of housing 62 of measuring body 18. In this way, when fastener 162 is rotated in a second direction, opposite the first direction, a loosening direction, wedge 156 is allowed to move downward and away from the upper surface of measuring body 18.

In the arrangement shown, as one example, as the lower end of wedge 156 angles outward, as fastener 162 is rotated in a tightening direction, wedge 156 is drawn upward. As wedge 156 is drawn upward, the lower outwardly extending surfaces of wedge 156 engage the outward facing surface of free arm 152. This engagement causes the lower end of the free arm 152 to pivot upon the connected upper end 154 of the arm 152. This inward movement of the free arm 152 causes the interior surface of the free arm 152 to pinch or contract upon measuring bar 20, which is held in place between the opposing affixed arm 152 and the movable free arm 152. As the fastener 162 is rotated further in the tightening direction, the wedge 156 is pulled further upward. The greater the force applied to the fastener 162, the greater the force applied to the wedge 156, the greater the force applied to the free arm 152 and the greater the clamping force or locking force applied to hold the measuring bar 20 in place.

In the arrangement shown, as one example, fastener 162 has an oversized or relatively large knob 164 which facilitates easy application of a great amount of clamping force upon measuring bar 20. In addition, by using a knob that can be hand-tightened and hand-loosened this eliminates the need to use tools, such as a screw driver or wrench, to loosen or tighten the measuring bar 20. In this way, the use of a knob 164 speeds and eases use of the system 10. In the arrangement shown, as one example, knob 164 of fastener 162 is easily accessible and easily used by a user as knob 164 is positioned above the exterior surface 64 of housing 62 on one side of the rear section 70.

In one arrangement, to allow for this relative movement of free arm 152 with respect to the other portions of housing 62, a window 170 is positioned in the exterior surface 64 of housing 62 adjacent free arm 152. In the arrangement shown, as one example, window 170 is an opening in the generally continuous exterior surface 64 of housing 62 that is positioned between opposing arms 152 at its side and extends all the way down to the upper surface 100 of measuring bar 20. This gap between opposing arms 152 formed by window 170 allows the opposing arms 152 to move toward and away from one another unencumbered by the material of measuring body 18 positioned between the opposing arms 152. A side benefit of this window 170 is that it provides visibility to the measuring indicia 108 of the upper surface 100 of measuring bar 20 just forward a distance from the reference point 140 of adjustable member 118. As such, the presence of window 170 also provides a user with greater context as to the position of measuring bar 20 as the user can see a greater portion of the measuring bar 20 through widow 170.

One benefit of this arrangement with wedge 156 is that the fastener 162 draws the wedge 156 upward yet the arms 152 apply a horizontal clamping force on measuring bar 20. In this way, the engagement and disengagement of arms 152 does not laterally move the measuring bar 20. As such, engagement and disengagement of locking member 50 does not affect the accuracy of the position of the measuring bar 20. This is accomplished by the fastener 162 extending in a vertical and perpendicular alignment to the length of measuring bar 20, the wedge 156 moving vertical and perpendicular alignment to the length of measuring bar 20, and the free arm 152 moving generally horizontally, laterally, to the length of measuring bar 20.

Support Member: In the arrangement shown, as one example, to help maintain horizontal and level alignment of measuring bodies 18 during use with workpieces 22 of various thicknesses, measuring bodies 18 include a support member 180. Support member 180 is formed of any suitable size, shape and design and is configured to facilitate quick, easy and accurate supporting of the rearward end of measuring bodies 18 in a flat and level manner regardless of the thickness of workpiece 22. Maintaining track 12 and measuring bodies 18 in a flat and level manner eases the use of the system 10, make setting the measurement distance easier, and improves accuracy.

In the arrangement shown, as one example, support member 180 includes an elongated body or main body 183, that has a generally cylindrical shape, that extends a length from a head 182 positioned at its upper end before terminating in a flat end at lower end 184. In the arrangement shown, as one example, support member 180 extends through an opening 186 of corresponding size in the rear section 70. In the arrangement shown, as one example, support 180 is positioned in rear section 70 on one side of measuring bar 20 whereas wedge 156 and fastener 162 of locking member 150 are positioned in rear section 70 on the other side of measuring bar 20.

In the arrangement shown, as one example, support member 180 is configured to slide vertically between a fully lowered position and a fully raised positon. In a fully lowered position, head 180 of support member 180 is adjacent or in engagement with the upper exterior surface 64 of housing 62 and the measuring body 18 is supported in a fully raised position. In a fully raised position, lower end 184 of support member 180 is in flat and flush alignment (or recessed alignment) with the rearward lower surface 110 of measuring body 18, and the measuring body 18 is in a fully lowered position. The user freely sets the height of support member 180 by sliding the support member 180 up and down within opening 186. Support 180 may be moved infinitely to any position between the fully raised or fully lowered position.

When the user finds their desired position of support member 180 the user may lock the position of the support member 180 in place using tightening member 188. In the arrangement shown, as one example a tightening member 188 is used in association with support member 180 to tighten support member 180 in place. In the arrangement shown, as one example, tightening member 188 includes a head or knob 190 that connects to a threaded shaft 192. In this arrangement, threaded shaft 192 of tightening member 188 extends through a portion of the housing 62 of measuring body 18 and engages a side of the elongated body of support member 180 between head 182 and lower end 184 as it extends through opening 186. In this way when tightening member 188 is rotated in a first direction, a tightening direction, the threaded shaft 192 engages the support member 180 thereby locking support member 180 in place. In this way when tightening member 188 is rotated in a second direction, opposite the first direction, a loosening direction, the threaded shaft 192 disengages the support member 180 thereby allowing it to freely move within opening 186.

In this way, the height of support member 180 may be quickly, easily and accurately set and secured in place using tightening member 188. In the arrangement shown, the length of support member 180 and opening 186 extend vertically, while the length of threaded shaft 192 of tightening member 188 extend horizontally, or said another way, they extend in perpendicular alignment to one another.

In the arrangement shown, as one example, a collar 194 is positioned in the material of housing 62 of measuring body 18. Collar 194 is any device that that receives and facilitates the threaded engagement between housing 62 of measuring body 18 and tightening member 188 while allowing tightening member 188 to be tightened against support member 180 thereby holding support member 180 in an accurate user-set position. In the arrangement shown, as one example, collar 194 is a metallic threaded insert that is positioned in the non-metallic, or plastic or composite, material of housing 62. In this arrangement, when using a metallic collar 194 this provides a greater level of durability and longevity when receiving the metallic threads of tightening member 82 as compared to the threads directly engaging the non-metallic, or plastic or composite, material of housing 62. In this arrangement, the metallic collar 194 may be attached to the material of housing 62 of measuring bodies 18 by any manner, method or means such as being molded into, threaded into, formed into, welded into, snap-fitted into, bolted into or connected by any other manner, method or means. The addition of this metallic threaded collar 194 into housing 62 of measuring body 18 provides a more durable and long lasting and accurate measuring body 18.

In one arrangement, when using measuring bodies 18, the user attaches measuring bodies 18 to track 12. The user then places the track 12 with attached measuring bodies 18 on top of a workpiece 22. At this point the measuring bodies 18 are suspended a distance above the work surface which is approximately equal to the thickness of the workpiece 22. Once in this position, the user rotates the tightening member 188 in a loosening direction. Once the forward end of the threaded shaft 192 of tightening member 188 disengages from the side of main body 183 of support member 180 the support member falls downward under the force of gravity through opening 186 in housing 62 until the lower end 184 of support member 180 engages the work surface at which point the user tightens the tightening member 188 until the forward end of the threaded shaft 192 of tightening member 188 again engages the side of main body 183 thereby locking the position of the support member 180 in place. In this way, the rearward end of measuring body 20 is supported and held level with the track 12 when the track is placed on top of a workpiece 22 which improves accuracy and ease of use.

In some applications, a certain amount of contact and friction holds support member 180 in place even when tightening engagement from tightening member 188 is removed. In this arrangement, it may be necessary and/or advantageous to slightly push down on the support member 180 to overcome a level of friction or resistance or contact between support member 180 and measuring body 18 until the lower end 184 of support member 180 engages the benchtop or work surface. In some arrangements, to ensure precise alignment and a level measuring body 18, it may be necessary or advantageous to raise the rearward end of measuring body 18 slightly while pushing down on the support member 180 to ensure that measuring body 18 and measuring bar 20 are level with the track 12 and the benchtop or work surface before tightening the tightening member 188. This overcomes the natural tendency for the rearward end of measuring body 18 and measuring bar 20 to rotate downward or sag downward under gravity and due to the large moment of inertia due to the measuring body 18 connecting at its front side 50 to the non-cutting side of track 12.

In Operation:

When track 12 is to be used to cut wide workpieces 22, one, two or more measuring bodies 18 are installed on track 12 by aligning the connection section 72 of the front end 50 of measuring bodies 18 with the T-slot of the non-cutting edge 30 of track 12. More specifically, the nuts 90 and guides 80 are aligned with and inserted into an open end of the T-slot of second protrusion 38. In this position, the forward surface 78 of connection section 72 is in flat and flush engagement with the non-cutting edge 30 of track 12, and the lower surface 76 of connection section 72 is in flat and flush engagement with the upper surface of second protrusion 38. In this position, measuring bodies 18 are slid along the T-slot of second protrusion 38 until they reach their desired position along track 12, which in many cases is the widest possible position that workpiece 22 and track 12 will allow.

Once the measuring bodies 18 are at their desired position on track 12, measuring bodies 18 are locked in place by rotating knobs 92 of tightening member 82 which pulls the nuts 90 upward and into engagement with the lower surface of the narrower section of the T-slot of second protrusion 38 thereby frictionally locking measuring body 18 in place along the T-slot of second protrusion 38.

Once measuring bodies 18 are locked in place, assuming the measuring bodies 18 are calibrated to track 12 (if measuring bodies 18 are not calibrated to track 12, the calibration procedure presented herein is performed), the measuring bodies 18 are set to the desired cut width by moving the locking member 150 to an unlocked or disengaged position. This is accomplished by rotating the knob 164 of fastener 162 in an unlocking direction. This rotation causes the threaded shaft 166 of fastener 162 to push or allow wedge 156 to move downward within the hollow interior of housing 62. As the wedge 156 moves downward the angled surface that engages the exterior facing edge of the movable arm 152 slides downward. As the effective width of wedge 156 on movable arm 152 gets narrower as the wedge 156 is lowered, this allows the lower end of movable arm 152 to move away from the side 104 of measuring bar 20. As the lower end of arm 152 moves sequentially away from measuring bar 20, as wedge 156 moves downward, sequentially less pressure is applied to measuring bar 20. Knob 164 is rotated in the unlocking direction until measuring bar 20 may be freely slid within housing 62 to the desired position.

Measuring bar 20 is slid to the desired position by pulling or pushing the rearward end 98 of measuring bar 20 such that it slides into or out of housing 62 in slot 106. Measuring bar 20 is moved until the desired measurement, as is indicated by measuring indicia 108 on the upper surface 100 of measuring bar 20 precisely aligns with the reference point 140 of second section 122 of adjustable member 118. In doing so, in the arrangement shown, the user looks downward through the see-through second section 122 upon the upper surface 100 of measuring bar 20. This is aided by the magnifying effects of the curved upper surface 134 of second section 122 of adjustable member 118.

Once the precise alignment of reference point 140 of second section 122 of adjustable member 118 with measuring indicia 108 on the upper surface 100 of measuring bar 20 is achieved the knob 164 of locking member 150 is rotated in a tightening direction. In doing so, this rotation causes the threaded shaft 166 of fastener 162 to pull or allow wedge 156 to move upward within the hollow interior of housing 62. As the wedge 156 moves upward the angled surface that engages the exterior facing edge of the movable arm 152 slides upward. As the effective width of wedge 156 on movable arm 152 gets wider as the wedge 156 is raised, this causes the lower end of movable arm 152 to move toward the side 104 of measuring bar 20. As the lower end of arm 152 moves sequentially toward measuring bar 20 as wedge 156 moves upward sequentially more pressure is applied to measuring bar 20. Knob 164 is rotated in the tightening direction until measuring bar 20 is firmly held in place between opposing arms 152.

Once measuring bar 20 is locked in place, the reading at reference point 140 precisely reads the distance between the forward end 96 of measuring bar 20 and the cutting edge 28 chip strip 40.

Once measuring bars 20 are set in place and locking member 150 is engaged, track 12 may be placed on a workpiece 22 to perform a cutting operation. Track 12 and measuring bodies 18 are placed on the upper surface of workpiece 22. That is, the lower surface 24 of track 12 is placed on the upper surface of workpiece 22. The track 12 is slid forward on the workpiece 22 until the forward edge 96 measuring bars 20 engage the edge of workpiece 22.

In one arrangement, to ensure that the measuring bodies 18 extend in a level fashion with track 12, support 180 is lowered such that the lower end 184 engages the upper surface of the work surface, such as a benchtop, that workpiece 22 is positioned on top of. To do this, the knob 190 of tightening member 188 is rotated in a loosening direction until support member 180 freely moves in opening 186. Once free, support member 188 is vertically slid until the lower end 184 engages the upper surface of the work surface that workpiece 22 rests upon and measuring body 18 extends in a straight and flat and flush alignment with track 12. Once in this position, the support member 188 is again tightened in place by rotating the knob 190 of tightening member 188 in a tightening direction thereby causing the end of threaded shaft 192 to engage the side of main body 183 of support member 180 thereby locking it in place.

Once in this position, the workpiece 22 is ready to cut.

The user places the guide 16 of saw 14 on the track 12 such that the features of the guide 16 mate with the features of the track 12 and the saw is powered and slid across the length of track 12 thereby cutting the workpiece at the cutting edge 28. Once the first workpiece 22, the track 12 may simply be raised off of the workpiece 22 and placed on the next workpiece 22 and the same cutting operation may be performed.

Alternative Arrangement—Snap Feature: In an alternative arrangement, with reference to FIGS. 18-24 connection section 72 includes a snap feature 300. Snap feature 300 is formed of any suitable size, shape and design and is configured to connect measuring bodies 18 to track 12 by insertion into the T-slot of second protrusion 38. In the arrangement shown, as one example, snap feature 300, when viewed from the side, has a flat upper surface 302 positioned at its forward end that connects to a rounded lower surface 304. A detent 306 is positioned at upper rearward edge of the lower surface 304 and protrudes outward therefrom a slight distance. Snap feature 300 includes an arm 308 that extends upward and rearward from flat upper surface 302 a distance and facilitates connection to the front side 50 of measuring body 18.

In this arrangement, snap feature 300 is configured to fit within the T-slot of second protrusion 38 with close and tight frictional engagement such that when snap feature 300 is inserted within the T-slot of second protrusion 38, measuring body 18 is held to and locked in place on track 12.

More specifically, in the arrangement shown, as one example, to install measuring body 18 on track 12 using snap feature 300, the measuring body 18 is moved to any position along the length of track 12. Once measuring body 18 is in the desired position along the length of track 12, the forward end of snap feature 300 is inserted within the narrow upper section of the T-slot of second protrusion 38. Next, once in this position, the rear side 52 of measuring body 18 is rotated downward until the snap feature 300 is fully inserted into and locked onto the T-slot of the second protrusion 38.

When snap feature 300 is fully inserted into and locked onto the T-slot of the second protrusion 38, the forward end of the flat upper surface 302 engages the lower surface of the forward lip that forms the narrow upper section of the T-slot of the second protrusion 38 in a flat and flush engagement. Also, when snap feature 300 is fully inserted into and locked onto the T-slot of the second protrusion 38, the forward end of the lower surface 304 of snap feature 300 engages the rear facing sidewall of the T-slot of the second protrusion 38 in a flat and flush engagement. Also, when snap feature 300 is fully inserted into and locked onto the T-slot of the second protrusion 38, the lower end of the lower surface 304 of snap feature 300 engages the upper surface of the bottom wall of the T-slot of the second protrusion 38 in a flat and flush engagement. Also, when snap feature 300 is fully inserted into and locked onto the T-slot of the second protrusion 38, the detent 306 of the lower surface 304 of snap feature 300 engages and extends just below the lower surface of the rearward lip that forms the narrow upper section of the T-slot of the second protrusion 38 in a flat and flush engagement. Also, when snap feature 300 is fully inserted into and locked onto the T-slot of the second protrusion 38, the lower surface of arm 308 of snap feature 300 engages the upper surface of the rearward lip that forms the narrow upper section of the T-slot of the second protrusion 38 in a flat and flush engagement.

In this way, snap feature 300 allows for the quick, easy and secure manner of attaching measuring body 18 to track 12.

To remove measuring body 18 from track 12 when using snap feature 300, the rear side 52 of measuring body 18 is simply raised, thereby causing snap feature 300 to come out of the T-slot of second protrusion 38.

Alternative Arrangement—Electronic/Digital Arrangement: In the arrangement shown in the figures, a manually readable narrow stock rip guide cutting system 10 is presented where the user manually sets and reads the measurement using measuring bar 20, measuring indicia 108 and adjustable member 118 of calibration member 116. While this manual arrangement is effective, efficient and accurate, it is hereby contemplated to include electronic components that provide an electronic readout of the measurement in association with an alternative arrangement of the narrow stock rip guide cutting system 10.

That is, in one arrangement, measuring bodies 18 include an electronic measuring system that includes a controller, a reading mechanism, a display 172, an input and a power source, among other components. In this arrangement, the controller controls the operation of the electronic measuring system, and may include a microprocessor and memory that in collaboration with one control operation of the electronic measuring system and provide the rules, guidelines, modes, manners and methods of operation. In this arrangement, the reading mechanism reads the position of measuring bar 20 so as to provide the needed measurement which is provided to controller. The reading or measurement is displayed on the display 172, which is any humanly perceptible display, and may include a digital display, an analog display, a plurality of lights or LEDs, it may even include an audible display, such as a plurality of beeps or a voice reading, or any combination thereof. Display 172 may be a touch screen. In this arrangement, input is any device or system that allows for the input of information into the electronic measuring system and may include one or more buttons or knobs, a touchscreen or any combination of a touchscreen, buttons, knobs or other inputs that allow for control of the electronic measuring system, such as turning the electronic measuring system on and off, calibrating the electronic measuring system, switching between empirical and metric measurement, or any other manner of control or operation. Power source may be any form of power that powers the electronic components of the electronic measuring system and may include one or more batteries, a solar cell, direct line-power or any combination thereof, which may be on board to the measuring body 18 or may be connected to measuring body 18 but is located outside of measuring body, or is any combination of these.

This electronic measuring system provides many benefits. Namely, in one arrangement, this electronic measuring system is easier to use as compared to a manually measured system. In one arrangement, this electronic measuring system, and its digital readout, is comforting to a user as it provides a digital readout of the measurement and thereby takes the guess-work out of the measurement that is a part of a manual reading. In one arrangement, the electronic measuring system is more-accurate than a manual system as the electronic reading mechanism provides a higher level of accuracy than a manual system. In one arrangement, the electronic measuring system is easier to use by a user as the digital readout is easier to read as compared to a manual reading (and in one arrangement the display may be back-lit which makes it easier and faster to read as the reading is illuminated). For all of these reasons, and many more, this electronic measuring system provides many improvements and advantages and benefits over the manual system.

T-Stop Arrangement:

While two measuring bodies 18 are shown in simultaneous use in the figures, it is hereby contemplated that a single measuring body 18 may be used. In one arrangement, when using only a single measuring body 18, to provide improved or optimum alignment of workpiece 22 an elongated stop feature is positioned at the forward end 96 of measuring bar 20. This elongated stop feature is what is often known as a T-stop, which has an elongated forward facing surface that extends in a generally perpendicular manner to the length of measuring bar 20 and extends in a generally parallel spaced manner to the cutting edge 28 of track 12. This elongated surface or edge of the T-stop feature of measuring bar 20 is configured to engage an edge of workpiece 22 and thereby provide parallel alignment of workpiece 22 to track 12 using only a single measuring body 18. In one arrangement, to provide increased alignment of the forward-to-back length of measuring body 18 with track 12 the forward end of measuring body 18 is laterally expanded to give the connection of measuring body 18 to track 12 a wider stance, which provides a higher degree of perpendicularity with the length of track. In one arrangement, multiple measuring bodies 18 having this T-stop alignment feature may simultaneously be used, which also has the tendency of providing increased alignment on workpiece 22. Also, in one arrangement, measuring bodies 22 may have two or more measuring bars 20, that may be connected to one another at their forward end 96, which provides increased alignment. In another arrangement, the width of measuring bar 20 is increased, which provides increased accuracy of alignment as well as an increased stop surface at the forward end 96 of measuring bar 20 for the accurate engagement of workpiece 22.

From the above discussion it will be appreciated that the narrow stock rip guide cutting system 10 and related methods of use, presented herein improves upon the state of the art.

Specifically, the narrow stock rip guide cutting system 10 and related methods of use presented: provides accurate cuts on narrow sheets of material; is safe to use; is efficient to use; is relatively inexpensive; is capable of making long straight cuts; can be used to cut wide sheets of material easily and accurately; is accurate; is efficient; provides precise alignment; can be used with workpieces with a wide range of thicknesses; is easy to learn how to use; is relatively small in size and shape; provides the benefits of a circular saw and a table saw in a single device; holds workpieces in a firm and secure manner; is easy to set up; is easy to take down; is formed of a minimum number of parts; is simple to use; is easier to use than prior art systems; is unique; collapses and is easy to store; is light weight; is high quality; has a robust design; has a long useful life; provides accurate and clean cuts; helps prevent chip tear-out; is durable; saves time; is fun to use; can be used with workpieces of practically any material; can be used on a job site; makes it easier to measure for cuts on wide workpieces and sheets of material; makes measuring more repeatable than prior art systems; reduces or eliminates the need for a helper when making cuts; and that firmly locks the measuring tape in place so as to allow repeatable cuts, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A system for cutting narrow workpieces, comprising:
a track;
the track extending a length from a first end to a second end;
the track extending a width from a cutting edge and a non-cutting edge;
the track configured to receive and guide a saw;
a first measuring body;
the first measuring body having a front side and a rear side;
the first measuring body operably connected to the track;
the first measuring body having a measuring bar;
the measuring bar extending a length from a forward end to a rearward end;
the first measuring body having a locking member;
the locking member having a wedge;
wherein the measuring bar slides with respect to the first measuring body thereby setting a cut length for a workpiece;
wherein the wedge operably engages the measuring bar, thereby locking the measuring bar in place at a desired measurement; and
wherein the forward end of the measuring bar extends below the track.

2. The system of claim 1, further comprising an electronic measuring system that provides a digital measurement reading.

3. The system of claim 1, wherein the locking member includes a fastener, wherein the fastener controls operation of the wedge.

4. The system of claim 1, wherein when a fastener associated with the wedge is rotated in a first direction, the wedge is pulled into the first measuring body thereby causing engagement of the measuring bar.

5. The system of claim 4, wherein when a fastener associated with the wedge is rotated in a second direction, the wedge is allowed to move away from the first measuring body thereby causing disengagement of the measuring bar, thereby allowing the measuring bar to move.

6. The system of claim 1, wherein the wedge indirectly engages the measuring bar, thereby locking the measuring bar in place.

7. The system of claim 1, wherein the wedge engages an arm that engages the measuring bar, thereby locking the measuring bar in place.

8. The system of claim 1, further comprising a calibration member connected to the first measuring body, wherein the calibration member facilitates calibration of measuring indicia of the measuring bar to the track.

9. The system of claim 1, further comprising a calibration member connected to the first measuring body, wherein the calibration member facilitates calibration of measuring indicia of the measuring bar to the track, wherein the calibration member is an adjustable lens.

10. The system of claim 1, wherein the measuring bar is a single continuous member.

11. The system of claim 1, further comprising a support, wherein the support adjustably supports the first measuring body at varying heights above a work surface.

12. A system for cutting narrow workpieces, comprising:
a track;
the track extending a length from a first end to a second end;
the track extending a width from a cutting edge and a non-cutting edge;
the track configured to receive and guide a saw;
a first measuring body;
the first measuring body having a front side and a rear side;
the first measuring body operably connected to the track;
the first measuring body having a measuring bar;
the measuring bar extending from a forward end to a rearward end;
wherein the measuring bar slides with respect to the first measuring body thereby setting a cut length for a workpiece;
a support;
the support operably connected to the first measuring body;
wherein the support adjusts to position the first measuring body at varying heights above a work surface.

13. The system of claim 12, wherein the support extends through the first measuring body.

14. The system of claim 12, wherein the support slides in a vertical manner to set the height of the first measuring body.

15. The system of claim 12, further comprising a tightening member, wherein the tightening member operably engages the support thereby locking the support in place.

16. The system of claim 12, further comprising a tightening member, wherein the tightening member operably engages the support thereby locking the support in place, wherein the tightening member includes a threaded shaft that directly engages the support.

17. The system of claim 12, further comprising the first measuring body having a locking member; the locking member having a wedge; the locking member having a fastener;
wherein the fastener causes the wedge to engage the measuring bar, thereby locking the measuring bar in place at a desired measurement.

18. The system of claim 12, further comprising a calibration member connected to the first measuring body, wherein the calibration member facilitates calibration of measuring indicia of the measuring bar to the track.

19. The system of claim 12, further comprising a calibration member connected to the first measuring body, wherein the calibration member facilitates calibration of measuring indicia of the measuring bar to the track, wherein the calibration member is an adjustable lens.

20. The system of claim 12, wherein the measuring bar is a single continuous member.

21. The system of claim 12, wherein the forward end of the measuring bar extends below the track.

22. A system for cutting narrow workpieces, comprising:
a track;
the track extending a length from a first end to a second end;
the track extending a width from a cutting edge and a non-cutting edge;
the track configured to receive and guide a saw;
a first measuring body;
the first measuring body having a front side and a rear side;
the first measuring body operably connected to the track;
the first measuring body having a measuring bar;
the measuring bar extending from a forward end to a rearward end;

the measuring bar having measuring indicia;
wherein the measuring bar slides with respect to the first measuring body thereby setting a cut length for a workpiece;
a calibration member;
the calibration member operably connected to the first measuring body;
wherein the calibration member adjusts with respect to the first measuring body, thereby calibrating the measuring indicia of the measuring bar to the track, and
wherein the calibration member includes an adjustable member held in place by a fastener.

23. The system of claim 22, wherein the calibration member is a lens.

24. The system of claim 22, wherein the calibration member is a reference edge.

25. The system of claim 22, further comprising a support operably connected to the first measuring body, wherein the support positions the first measuring body at varying heights above a work surface.

26. The system of claim 22, further comprising the first measuring body having a locking member; the locking member having a wedge; the locking member having a fastener;
wherein the fastener causes the wedge to operably engage the measuring bar, thereby locking the measuring bar in place at a desired measurement.

27. The system of claim 22, wherein the measuring bar is a single continuous member.

28. The system of claim 22, wherein the forward end of the measuring bar extends below the track.

29. A system for cutting narrow workpieces, comprising:
a track;
the track extending a length from a first end to a second end;
the track extending a width from a cutting edge and a non-cutting edge;
the track configured to receive and guide a saw;
a first measuring body;
the first measuring body having a front side and a rear side;
the first measuring body operably connected to the track;
the first measuring body having a measuring bar;
the measuring bar extending from a forward end to a rearward end;
the measuring bar having measuring indicia thereon;
wherein the measuring bar slides with respect to the first measuring body thereby setting a cut length for a workpiece;
wherein the forward end of the measuring bar extends under the track;
wherein the measuring bar with measuring indicia is a single continuous monolithic member.

30. The system of claim 29, further comprising a support, wherein the support adjustably supports the first measuring body at varying heights above a work surface.

31. The system of claim 29, wherein the wedge directly engages the measuring bar, thereby locking the measuring bar in place.

32. The system of claim 29, wherein the wedge indirectly engages the measuring bar, thereby locking the measuring bar in place.

33. The system of claim 29, further comprising a calibration member connected to the first measuring body, wherein the calibration member facilitates calibration of measuring indicia of the measuring bar to the track.

34. The system of claim 29, further comprising a calibration member connected to the first measuring body, wherein the calibration member facilitates calibration of measuring indicia of the measuring bar to the track, wherein the calibration member is an adjustable lens.

35. The system of claim 29, wherein the forward end of the measuring bar extends below the track.

36. The system of claim 29, further comprising a support, wherein the support adjustably supports the first measuring body at varying heights.

37. A system for cutting narrow workpieces, comprising:
a first measuring body;
the first measuring body configured to attach to a track;
the first measuring body having a front side and a rear side;
the first measuring body having a measuring bar;
the measuring bar extending from a forward end to a rearward end;
the measuring bar having measuring indicia thereon;
wherein the measuring bar slides with respect to the first measuring body thereby setting a cut length for a workpiece;
wherein the measuring bar with measuring indicia is a single continuous monolithic member;
the first measuring body having a locking member;
wherein the locking member selectively locks the measuring bar in place at a desired measurement;
the first measuring body having a support;
wherein the support adjusts to position the first measuring body at varying heights above a work surface.

38. The system of claim 37, wherein the locking member includes a wedge operatively connected to a fastener that cooperate to lock the measuring bar in place.

39. The system of claim 37 further comprising a calibration member, the calibration member configured to calibrate the measuring bar to the track.

40. A system for cutting narrow workpieces, comprising:
a track;
the track extending a length from a first end to a second end;
the track extending a width from a cutting edge and a non-cutting edge;
the track configured to receive and guide a saw;
a first measuring body;
the first measuring body having a front side and a rear side;
the first measuring body operably connected to the track;
the first measuring body having a measuring bar;
the measuring bar extending from a forward end to a rearward end;
the measuring bar having measuring indicia thereon;
wherein the measuring bar slides with respect to the first measuring body thereby setting a cut length for a workpiece;
wherein the forward end of the measuring bar extends under the track.

* * * * *